United States Patent
Lee et al.

(10) Patent No.: US 11,042,703 B2
(45) Date of Patent: Jun. 22, 2021

(54) METHOD AND DEVICE FOR GENERATING NATURAL LANGUAGE EXPRESSION BY USING FRAMEWORK

(71) Applicant: Samsung Electronics Co., Ltd., Suwon-si (KR)

(72) Inventors: Jae Yong Lee, Seoul (KR); Tae Kwang Um, Suwon-si (KR); Han Jun Ku, Suwon-si (KR); Sung Pa Park, Seoul (KR); Jae Yung Yeo, Seongnam-si (KR); Da Som Lee, Seoul (KR); Yong Joon Jeon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/806,861

(22) Filed: Mar. 2, 2020

(65) Prior Publication Data
US 2020/0202070 A1    Jun. 25, 2020

Related U.S. Application Data

(63) Continuation of application No. 15/942,241, filed on Mar. 30, 2018, now Pat. No. 10,579,726.

(30) Foreign Application Priority Data

Apr. 5, 2017    (KR) .................... 10-2017-0044302

(51) Int. Cl.
*G10L 15/00*    (2013.01)
*G10L 15/18*    (2013.01)
(Continued)

(52) U.S. Cl.
CPC .......... *G06F 40/237* (2020.01); *G06F 3/0488* (2013.01); *G06F 3/165* (2013.01);
(Continued)

(58) Field of Classification Search
CPC .... G06F 16/3329; G06F 3/0488; G06F 3/165; G06F 3/167; G06F 40/20; G06F 9/451; G06F 9/542
(Continued)

(56) References Cited

U.S. PATENT DOCUMENTS

| | | | |
|---|---|---|---|
| 5,528,491 A * | 6/1996 | Kuno ............... | G06F 40/44 704/9 |
| 8,145,587 B2 * | 3/2012 | Barry ............... | G06F 9/451 706/47 |

(Continued)

FOREIGN PATENT DOCUMENTS

KR    10-2010-0071794 A    6/2010

OTHER PUBLICATIONS

European Patent Office, "European Search Report," Application No. EP 18162282.0, dated Aug. 29, 2018, 9 pages.

*Primary Examiner* — Khai N. Nguyen

(57) ABSTRACT

An electronic device includes a touchscreen display, a wireless communication circuit, a memory storing a framework, and at least one processor. The processor is configured to receive a first event or a second event, to provide the framework with a notification object associated with an event received among the first event and the second event, to parse the notification object to obtain one or more parameters, to select one or more tasks associated with the received event based on at least part of the one or more parameters by using the framework, to select a natural language expression indicating at least one task of the one or more tasks, to provide a user interface including the natural language expression, through the touchscreen display, and to execute the at least one task based at least partly on a user input of the natural language expression provided on the touchscreen display.

18 Claims, 33 Drawing Sheets

(51) Int. Cl.
*G06F 17/00* (2019.01)
*G06F 40/237* (2020.01)
*G06F 3/16* (2006.01)
*G06F 16/332* (2019.01)
*G06F 9/451* (2018.01)
*G06F 3/0488* (2013.01)
*G06F 9/54* (2006.01)

(52) U.S. Cl.
CPC .............. *G06F 3/167* (2013.01); *G06F 9/451* (2018.02); *G06F 9/542* (2013.01); *G06F 16/3329* (2019.01)

(58) Field of Classification Search
USPC .......................................................... 704/9
See application file for complete search history.

(56) References Cited

U.S. PATENT DOCUMENTS

| | | | |
|---|---|---|---|
| 8,594,997 B2 * | 11/2013 | Soltani | G06F 3/167 |
| | | | 704/9 |
| 8,660,849 B2 | 2/2014 | Gruber et al. | |
| 8,670,979 B2 | 3/2014 | Gruber et al. | |
| 8,706,503 B2 | 4/2014 | Cheyer et al. | |
| 8,731,942 B2 | 5/2014 | Cheyer et al. | |
| 8,799,000 B2 | 8/2014 | Guzzoni et al. | |
| 8,892,446 B2 | 11/2014 | Cheyer et al. | |
| 8,903,716 B2 | 12/2014 | Chen et al. | |
| 8,930,191 B2 | 1/2015 | Gruber et al. | |
| 8,942,986 B2 | 1/2015 | Cheyer et al. | |
| 9,117,447 B2 | 8/2015 | Gruber et al. | |
| 9,223,537 B2 * | 12/2015 | Brown | G06F 3/165 |
| 9,318,108 B2 | 4/2016 | Gruber et al. | |
| 9,372,851 B2 * | 6/2016 | Hazen | G06F 40/279 |
| 9,548,050 B2 | 1/2017 | Gruber et al. | |
| 10,579,726 B2 * | 3/2020 | Lee | G06F 3/167 |
| 2009/0077458 A1 * | 3/2009 | Barry | G06F 9/451 |
| | | | 715/200 |
| 2010/0159896 A1 * | 6/2010 | Shin | H04M 3/42144 |
| | | | 455/414.1 |
| 2010/0241990 A1 * | 9/2010 | Gabriel | G06Q 10/06 |
| | | | 715/810 |
| 2012/0016678 A1 | 1/2012 | Gruber et al. | |
| 2012/0245944 A1 | 9/2012 | Gruber et al. | |
| 2013/0110505 A1 * | 5/2013 | Gruber | H04M 1/72563 |
| | | | 704/9 |
| 2013/0110515 A1 | 5/2013 | Guzzoni et al. | |
| 2013/0110518 A1 | 5/2013 | Gruber et al. | |
| 2013/0110519 A1 | 5/2013 | Cheyer et al. | |
| 2013/0110520 A1 | 5/2013 | Cheyer et al. | |
| 2013/0111348 A1 | 5/2013 | Gruber et al. | |
| 2013/0111487 A1 | 5/2013 | Cheyer et al. | |
| 2013/0117022 A1 | 5/2013 | Chen et al. | |
| 2013/0185074 A1 | 7/2013 | Gruber et al. | |
| 2013/0185081 A1 | 7/2013 | Cheyer et al. | |
| 2014/0039878 A1 * | 2/2014 | Wasson | G06F 40/40 |
| | | | 704/9 |
| 2015/0278199 A1 * | 10/2015 | Hazen | G06F 40/40 |
| | | | 704/9 |
| 2015/0281401 A1 * | 10/2015 | Le | H04L 67/42 |
| | | | 709/203 |
| 2016/0253310 A1 * | 9/2016 | Hazen | G06F 40/253 |
| | | | 704/9 |
| 2017/0091612 A1 * | 3/2017 | Gruber | G06F 40/169 |
| 2017/0178626 A1 | 6/2017 | Gruber et al. | |
| 2018/0293220 A1 * | 10/2018 | Lee | G06F 3/167 |
| 2020/0202070 A1 * | 6/2020 | Lee | G06F 3/165 |

* cited by examiner

METHOD AND DEVICE FOR GENERATING NATURAL LANGUAGE EXPRESSION BY USING FRAMEWORK

CROSS-REFERENCE TO RELATED APPLICATIONS

This application is a continuation of U.S. patent application Ser. No. 15/942,241 filed on Mar. 30, 2018, now U.S. Pat. No. 10,579,726, which is based on and claims priority under 35 U. S.C. § 119(a) to Korean Patent Application No. 10-2017-0044302 filed on Apr. 5, 2017 in the Korean Intellectual Property Office, the disclosures of which are herein incorporated by reference in their entirety.

BACKGROUND

1. Field

The present disclosure relates to a technology that generates a natural language expression using a framework.

2. Description of Related Art

An artificial intelligence system refers to a system, which learns and judges by itself and improves a recognition rate as it is used, as a computer system which implements human-level intelligence.

An artificial intelligence technology may include a machine learning (deep learning) technique using an algorithm that classifies or learns the characteristics of pieces of input data by themselves, and element technologies that emulate the functions of a human brain, for example, recognition, determination, and the like, by using a machine learning algorithm.

For example, the element technologies may include at least one of a language understanding technology that recognizes a language/character of a human, a visual understanding technology that recognizes objects like human vision, an inference or prediction technique that determines information to logically infer and predict the determined information, a knowledge expression technology that processes human experience information as knowledge data, and an operation control technology that controls autonomous driving of the vehicle and the motion of the robot.

In addition to a conventional input scheme using a keyboard or a mouse, the latest electronic devices have supported various input schemes such as a voice input and the like. For example, the electronic device such as a smartphone or a tablet PC may recognize the voice of a user input in a state where a speech recognition service is executed and may execute an action corresponding to a voice input or may provide the result found depending on the voice input.

Nowadays, the speech recognition service is being developed based on a technology processing a natural language. The technology processing the natural language refers to a technology that grasps the intent of the user utterance and provides the user with the result suitable for the intent.

SUMMARY

A speech recognition service may store the expected exemplification of a user input and may provide a user with the stored exemplification as a hint.

However, when the current context of the user terminal is the same as the stored context, the service may provide the user with only a hint that is mapped to the corresponding context.

Embodiments according to the present disclosure address at least the above-mentioned problems and/or disadvantages and provide at least the advantages described below. Accordingly, certain embodiments according to the present disclosure provide a method of providing a hint by using a notification that is received from the outside of a user terminal or is generated by the user terminal.

An electronic device according to certain embodiments of this disclosure includes a housing, a touchscreen display exposed through a part of the housing, a wireless communication circuit disposed inside the housing, a memory storing a framework, and at least one processor electrically connected to the touchscreen display, the wireless communication circuit, and the memory. The processor is configured to receive a first event from the outside of the electronic device through the wireless communication circuit or to receive a second event generated from the inside of the electronic device, to provide the framework with a notification object associated with an event received among the first event and the second event, to parse the notification object to obtain one or more parameters, to select one or more tasks associated with the received event based on at least part of the one or more parameters by using the framework, to select a natural language expression indicating at least one task of the one or more tasks, to provide a user interface including the natural language expression, through the touchscreen display, and to execute the at least one task based at least partly on a user input of the natural language expression provided on the touchscreen display.

A method of generating a hint according to certain embodiments of this disclosure includes receiving a first event from the outside of an electronic device or receiving a second event generated from the inside of the electronic device, providing a framework with a notification object associated with an event received among the first event and the second event, parsing the notification object to obtain one or more parameters, selecting one or more tasks associated with the received event based on at least part of the one or more parameters by using the framework, selecting a request for a natural language expression indicating at least one task of the one or more tasks, providing a user interface including the natural language expression through a touchscreen display, and executing the at least one task based at least partly on a user input of the natural language expression through the touchscreen display.

A computer-readable recording medium according to certain embodiments of this disclosure stores instructions, when executed by a processor of an electronic device, causing the electronic device to receive a first event from the outside of the electronic device or receive a second event generated from the inside of the electronic device, to provide a framework with a notification object associated with an event received among the first event and the second event, to parse the notification object to obtain one or more parameters, to select one or more tasks associated with the received event based on at least part of the one or more parameters by using the framework, to select a request for a natural language expression indicating at least one task of the one or more tasks, to provide a user interface including the natural language expression through a touchscreen display, and to execute the at least one task based at least partly on a user input of the natural language expression through the touchscreen display.

According to various embodiments of the present disclosure, an electronic device may provide a hint corresponding to the current context of a user terminal by using various parameters of a notification object.

The electronic device according to various embodiments of the present disclosure may generate a hint by using various parameters of a notification object and the context information of a user terminal, and thus may allow a user to utilize a speech recognition service.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure may be described to be associated with accompanying drawings. Accordingly, those of ordinary skill in the art will recognize that modification, equivalent, and/or alternative on the various embodiments described herein can be variously made without departing from the scope and spirit of the present disclosure.

Before describing certain embodiments according to the present disclosure, an integrated intelligent system to which some embodiment of the present disclosure are applied will be described.

Figure 1:
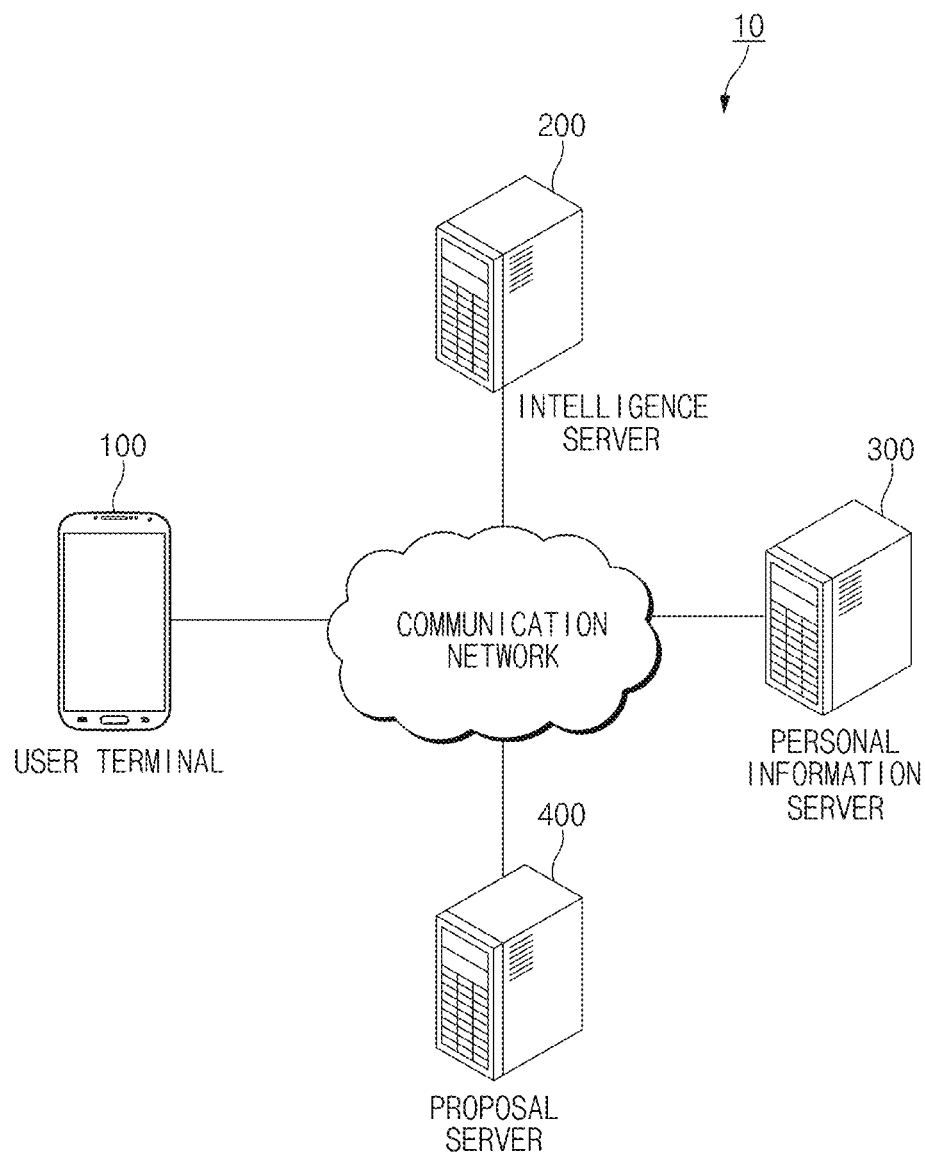
FIG. 1 illustrates an integrated intelligent system, according to various embodiments of the present disclosure.

FIG. 1 illustrates an integrated intelligent system, according to various embodiments of the present disclosure.

Referring to the non-limiting example of FIG. 1, an integrated intelligent system 10 may include a user terminal 100, an intelligence server 200, a personal information server 300, or a proposal server 400.

According to certain embodiments, the user terminal 100 may provide a service necessary for a user through an app (or an application program) (for example, an alarm app, a message app, a picture (gallery) app, or the like) stored in the user terminal 100. For example, the user terminal 100 may execute and operate one or more other apps through an intelligence app (or a speech recognition app) stored in the user terminal 100. A user input for launching and operating the other app through the intelligence app of the user terminal 100 may be received. For example, the user input may be received through a physical button, a touch pad, a voice input, a remote input, or the like. According to some embodiments, various types of terminal devices (or an electronic device), which are connected with Internet, such as a mobile phone, a smartphone, personal digital assistant (PDA), a notebook computer, and the like may correspond to the user terminal 100.

According to certain embodiments, the user terminal 100 may receive a voice command or user utterance as a user input. The user terminal 100 may receive the user utterance and may generate an instruction for operating an app based on the user utterance. As such, the user terminal 100 may operate the app by using the instruction.

The intelligence server 200 may receive a voice input of a user from the user terminal 100 over a communication network and may change the voice input to text data. In another embodiment, the intelligence server 200 may generate (or select) a path rule based on the text data. The path rule may include information about an action (or an operation) for performing the function of an app or information about a parameter necessary to perform the action. In addition, the path rule may include the order of the action of the app. The user terminal 100 may receive the path rule, may select an app depending on the path rule, and may execute an action included in the path rule in the selected app.

For example, the user terminal 100 may execute the action and may display a screen corresponding to a state of the user terminal 100, which executes the action, in a display. In another example, the user terminal 100 may execute the action and may not display the result obtained by executing the action in the display. For example, the user terminal 100 may execute a plurality of actions and may display only the result of a part of the plurality of actions in the display. For example, the user terminal 100 may display only the result, which is obtained by executing the last action, in the display. For another example, the user terminal 100 may receive the user input to display the result obtained by executing the action in the display.

According to the non-limiting example of FIG. 1, personal information server 300 may include a database in which user information is stored. For example, the personal information server 300 may receive the user information (e.g., context information, information about execution of an app, or the like) from the user terminal 100 and may store the user information in the database. The intelligence server 200 may be used to receive the user information from the personal information server 300 over the communication network and to generate a path rule associated with the user input. According to certain embodiments, the user terminal 100 may receive the user information from the personal information server 300 over the communication network, and may use the user information as information for managing the database.

In some embodiments according to this disclosure, proposal server 400 may include a database storing information about a function in a terminal, introduction of an application, or a function to be provided. For example, the proposal server 400 may include a database associated with a function that a user utilizes by receiving the user information of the user terminal 100 from the personal information server 300. The user terminal 100 may receive information about the function to be provided from the proposal server 400 over the communication network and may provide the information to the user.

Figure 2:
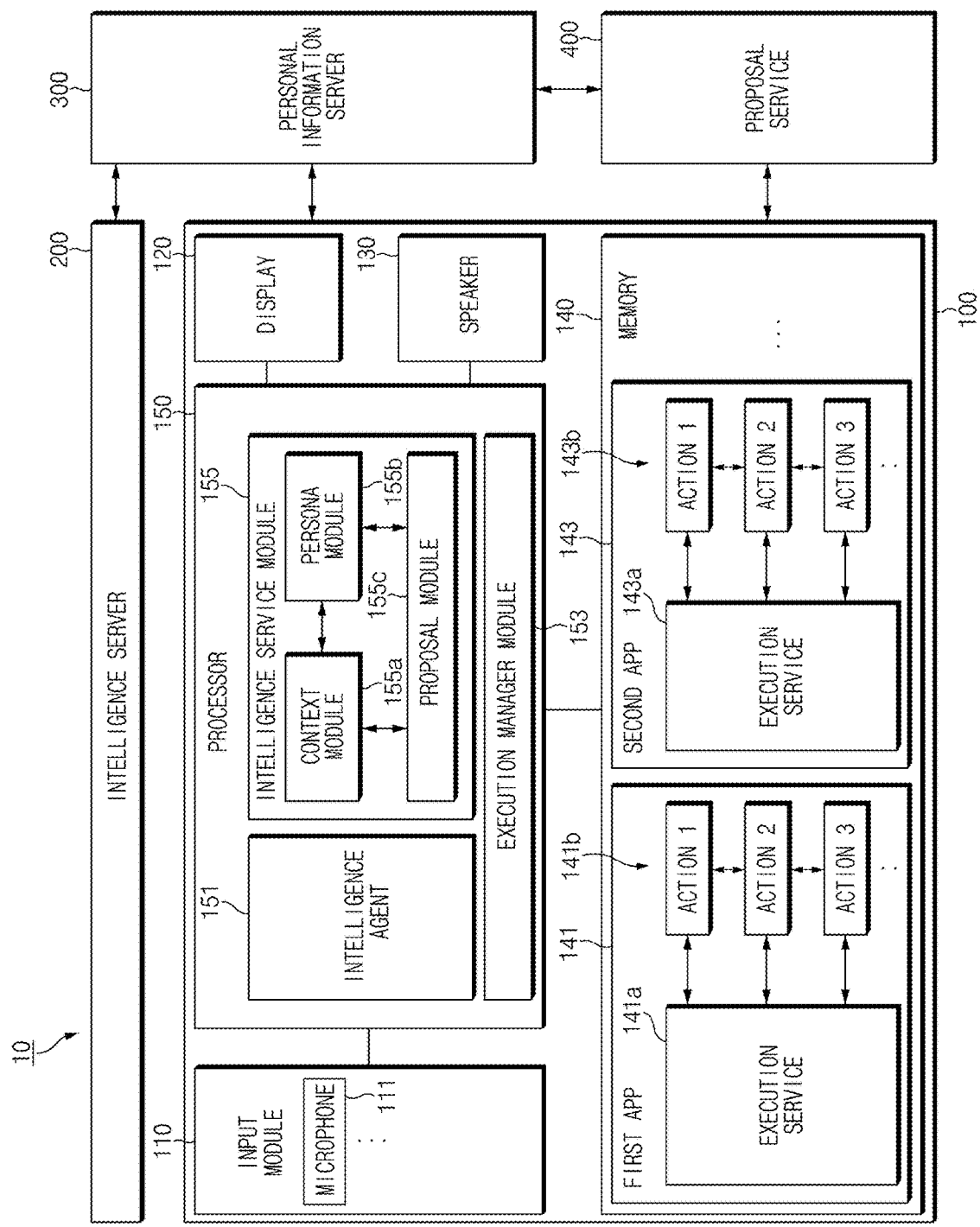
FIG. 2 illustrates in block diagram format, a user terminal of an integrated intelligent system, according to some embodiments of the present disclosure.

FIG. 2 illustrates, in block diagram format, a user terminal of an integrated intelligent system, according to some embodiments of the present disclosure.

Referring to the non-limiting example of FIG. 2, the user terminal 100 may include an input module 110, a display 120, a speaker 130, a memory 140, or a processor 150. The user terminal 100 may further include a housing, and elements of the user terminal 100 may be seated in the housing or may be positioned on the housing.

According to at least one embodiment, the input module 110 may receive a user input from a user. For example, the input module 110 may receive the user input from the connected external device (e.g., a keyboard or a headset). For another example, the input module 110 may include a touch screen (e.g., a touch screen display) coupled to the display 120. For another example, the input module 110 may include a hardware key (or a physical key) placed in the user terminal 100 (or the housing of the user terminal 100).

According to certain embodiments, the input module 110 may include a microphone (e.g., a microphone 111 of FIG. 3) that is capable of receiving user utterance as a voice signal. For example, the input module 110 may include a speech input system and may receive the utterance of the user as a voice signal through the speech input system.

According to certain embodiments, the display 120 may display an image, a video, and/or an execution screen of an application. For example, the display 120 may display a graphic user interface (GUI) of an app.

According to certain embodiments, the speaker 130 may output the voice signal. For example, the speaker 130 may output the voice signal generated in the user terminal 100 to the outside.

According to certain embodiments, the memory 140 may store a plurality of apps 141 and 143. The plurality of apps 141 and 143 stored in the memory 140 may be selected, launched, and executed depending on the user input.

According to at least one embodiment, the memory 140 may include a database capable of storing information necessary to recognize the user input. For example, the memory 140 may include a log database capable of storing log information. For another example, the memory 140 may include a persona database capable of storing user information.

According to some embodiments, the memory 140 may store the plurality of apps 141 and 143, and the plurality of apps 141 and 143 may be loaded to operate. For example, the plurality of apps 141 and 143 stored in the memory 140 may be loaded by an execution manager module 153 of the processor 150 to operate. The plurality of apps 141 and 143 may include execution services 141*a* and 143*a* performing a function or a plurality of actions (or unit actions) 141*b* and 143*b*. The execution services 141*a* and 143*a* may be generated by the execution manager module 153 of the processor 150 and then may execute the plurality of actions 141*b* and 143*b*.

According to certain embodiments, when the actions 141*b* and 143*b* of the apps 141 and 143 are executed, an execution state screen according to the execution of the actions 141*b* and 143*b* may be displayed in the display 120. For example, the execution state screen may be a screen in a state where the actions 141*b* and 143*b* are completed. For another example, the execution state screen may be a screen in a state where the execution of the actions 141*b* and 143*b* is in partial landing (e.g., in the case where a parameter necessary for the actions 141*b* and 143*b* are not input).

According to some embodiments, the execution services 141*a* and 143*a* may execute the actions 141*b* and 143*b* depending on a path rule. For example, the execution services 141*a* and 143*a* may be activated by the execution manager module 153, may receive an execution request from the execution manager module 153 depending on the path rule, and may execute the actions 141*b* and 143*b* of the apps 141 and 143 depending on the execution request. If the execution of the actions 141*b* and 143*b* is completed, the execution services 141*a* and 143*a* may transmit completion information to the execution manager module 153.

According to at least one embodiment, in the case where the plurality of the actions 141*b* and 143*b* are respectively executed in the apps 141 and 143, the plurality of the actions 141b and 143b may be sequentially executed. If the execution of one action (action 1) is completed, the execution services 141a and 143a may open the next action (action 2) and may transmit completion information to the execution manager module 153. Here, it is understood that opening an arbitrary action is to change a state of the arbitrary action to an executable state or to prepare the execution of the arbitrary action. In other words, if the arbitrary action is not opened, the corresponding action may be not executed. If the completion information is received, the execution manager module 153 may transmit an execution request for the next actions 141b and 143b to an execution service (e.g., action 2). According to an embodiment, in the case where the plurality of apps 141 and 143 are executed, the plurality of apps 141 and 143 may be sequentially executed. For example, if receiving the completion information after the execution of the last action of the first app 141 is executed, the execution manager module 153 may transmit the execution request of the first action of the second app 143 to the execution service 143a.

According to certain embodiments, in the case where the plurality of the actions 141b and 143b are executed in the apps 141 and 143, a result screen according to the execution of each of the executed plurality of the actions 141b and 143b may be displayed in the display 120. According to an embodiment, only a part of a plurality of result screens according to the executed plurality of the actions 141b and 143b may be displayed in the display 120.

According to some embodiments, the memory 140 may store an intelligence app (e.g., a speech recognition app) operating in conjunction with an intelligence agent 151. The app operating in conjunction with the intelligence agent 151 may receive and process the utterance of the user as a voice signal. According to an embodiment, the app operating in conjunction with the intelligence agent 151 may be operated by a specific input (e.g., an input through a hardware key, an input through a touch screen, or a specific voice input) input through the input module 110.

According to at least one embodiment, the processor 150 may control overall actions of the user terminal 100. For example, the processor 150 may control the input module 110 to receive the user input. The processor 150 may control the display 120 to display an image. The processor 150 may control the speaker 130 to output the voice signal. The processor 150 may control the memory 140 to read or store necessary information.

According to various embodiments, the processor 150 may include the intelligence agent 151, the execution manager module 153, or an intelligence service module 155. In an embodiment, the processor 150 may drive the intelligence agent 151, the execution manager module 153, or the intelligence service module 155 by executing instructions stored in the memory 140. Modules described in various embodiments of the present disclosure may be implemented by hardware or by software. In various embodiments of the present disclosure, it is understood that the action executed by the intelligence agent 151, the execution manager module 153, or the intelligence service module 155 is an action executed by the processor 150.

According to at least one embodiment, the intelligence agent 151 may generate an instruction for operating an app based on the voice signal received as the user input. According to an embodiment, the execution manager module 153 may receive the generated instruction from the intelligence agent 151, and may select, launch, and operate the apps 141 and 143 stored in the memory 140. According to some embodiments, the intelligence service module 155 may manage information of the user and may use the information of the user to process the user input.

The intelligence agent 151 may transmit and process the user input received through the input module 110 to the intelligence server 200.

According to certain embodiments, before transmitting the user input to the intelligence server 200, the intelligence agent 151 may pre-process the user input. According to an embodiment, to pre-process the user input, the intelligence agent 151 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user voice included in the user input to search for a part in which the user voice is present. The AGC module may adjust the volume of the user input so as to be suitable to recognize and process the user input. According to an embodiment, the intelligence agent 151 may include all the pre-processing elements for performance. However, in another embodiment, the intelligence agent 151 may include a part of the pre-processing elements to operate at low power.

According to some embodiments, the intelligence agent 151 may include a wake up recognition module recognizing a call of a user. The wake up recognition module may recognize a wake up instruction of the user through the speech recognition module. In the case where the wake up recognition module receives the wake up instruction, the wake up recognition module may activate the intelligence agent 151 to receive the user input. According to an embodiment, the wake up recognition module of the intelligence agent 151 may be implemented with a low-power processor (e.g., a processor included in an audio codec). According to at least one embodiment, the intelligence agent 151 may be activated depending on the user input entered through a hardware key. In the case where the intelligence agent 151 is activated, an intelligence app (e.g., a speech recognition app) operating in conjunction with the intelligence agent 151 may be executed.

According to certain embodiments, the intelligence agent 151 may include a speech recognition module for performing the user input. The speech recognition module may recognize the user input for executing an action in an app. For example, the speech recognition module may recognize a limited user (voice) input (e.g., utterance such as "click" for executing a capturing action when a camera app is being executed) for executing an action such as the wake up instruction in the apps 141 and 143. For example, the speech recognition module for recognizing a user input while assisting the intelligence server 200 may recognize and rapidly process a user instruction capable of being processed in the user terminal 100. According to an embodiment, the speech recognition module for executing the user input of the intelligence agent 151 may be implemented in an app processor.

According to various embodiments, the speech recognition module (including the speech recognition module of a wake up module) of the intelligence agent 151 may recognize the user input by using an algorithm for recognizing a voice. For example, the algorithm for recognizing the voice may be at least one of a hidden Markov model (HMM) algorithm, an artificial neural network (ANN) algorithm, or a dynamic time warping (DTW) algorithm.

According to certain embodiments, the intelligence agent 151 may change the voice input of the user to text data. According to at least one embodiment, the intelligence agent 151 may transmit the voice of the user to the intelligence server 200 to receive the changed text data. As such, the intelligence agent 151 may display the text data in the display 120.

According to various embodiments, the intelligence agent 151 may receive a path rule from the intelligence server 200. According to at least one embodiment, the intelligence agent 151 may transmit the path rule to the execution manager module 153.

According to certain embodiments, the intelligence agent 151 may transmit the execution result log according to the path rule received from the intelligence server 200 to the intelligence service module 155, and the transmitted execution result log may be accumulated and managed in preference information of the user of a persona module 155*b*.

According to certain embodiments, the execution manager module 153 may receive the path rule from the intelligence agent 151 to execute the apps 141 and 143 and may allow the apps 141 and 143 to execute the actions 141*b* and 143*b* included in the path rule. For example, the execution manager module 153 may transmit instruction information for executing the actions 141*b* and 143*b* to the apps 141 and 143 and may receive completion information of the actions 141*b* and 143*b* from the apps 141 and 143.

According to various embodiments, the execution manager module 153 may transmit or receive the instruction information for executing the actions 141*b* and 143*b* of the apps 141 and 143 between the intelligence agent 151 and the apps 141 and 143. The execution manager module 153 may bind the apps 141 and 143 to be executed depending on the path rule and may transmit the instruction information of the actions 141*b* and 143*b* included in the path rule to the apps 141 and 143. For example, the execution manager module 153 may sequentially transmit the actions 141*b* and 143*b* included in the path rule to the apps 141 and 143 and may sequentially execute the actions 141*b* and 143*b* of the apps 141 and 143 depending on the path rule.

According to at least one embodiment, the execution manager module 153 may manage execution states of the actions 141*b* and 143*b* of the apps 141 and 143. For example, the execution manager module 153 may receive information about the execution states of the actions 141*b* and 143*b* from the apps 141 and 143. For example, in the case where the execution states of the actions 141*b* and 143*b* are in partial landing (e.g., in the case where a parameter necessary for the actions 141*b* and 143*b* are not input), the execution manager module 153 may transmit information about the partial landing to the intelligence agent 151. The intelligence agent 151 may make a request for an input of necessary information (e.g., parameter information) to the user by using the received information. For another example, in the case where the execution state of the actions 141*b* and 143*b* are in an operating state, the utterance may be received from the user, and the execution manager module 153 may transmit information about the apps 141 and 143 being executed and the execution states of the apps 141 and 143 to the intelligence agent 151. The intelligence agent 151 may receive parameter information of the utterance of the user through the intelligence server 200 and may transmit the received parameter information to the execution manager module 153. The execution manager module 153 may change a parameter of each of the actions 141*b* and 143*b* to a new parameter by using the received parameter information.

In the non-limiting example of FIG. 2, the execution manager module 153 may transmit the parameter information included in the path rule to the apps 141 and 143. In the case where the plurality of apps 141 and 143 are sequentially executed depending on the path rule, the execution manager module 153 may transmit the parameter information included in the path rule from one app to another app.

According to some embodiments, the execution manager module 153 may receive a plurality of path rules. The execution manager module 153 may select a plurality of path rules based on the utterance of the user. For example, where the user utterance specifies the app 141 executing a part of the action 141*b* but does not specify the app 143 executing any other action 143*b*, the execution manager module 153 may receive a plurality of different path rules in which the same app 141 (e.g., an gallery app) executing the part of the action 141*b* is executed and in which different apps 143 (e.g., a message app or a Telegram app) executing the other action 143*b*. For example, the execution manager module 153 may execute the same actions 141*b* and 143*b* (e.g., the same successive actions 141*b* and 143*b*) of the plurality of path rules. In the case where the execution manager module 153 executes the same action, the execution manager module 153 may display a state screen for selecting the different apps 141 and 143 included in the plurality of path rules in the display 120.

According to various embodiments, the intelligence service module 155 may include a context module 155*a*, a persona module 155*b*, or a proposal module 155*c*.

The context module 155*a* may collect current states of the apps 141 and 143 from the apps 141 and 143. For example, the context module 155*a* may receive context information indicating the current states of the apps 141 and 143 to collect the current states of the apps 141 and 143.

According to the non-limiting example of FIG. 2, persona module 155*b* may manage personal information of the user utilizing the user terminal 100. For example, the persona module 155*b* may collect the usage information and the execution result of the user terminal 100 to manage personal information of the user.

The proposal module 155*c* may predict the intent of the user to recommend an instruction to the user. For example, the proposal module 155*c* may recommend an instruction to the user in consideration of the current state (e.g., a time, a place, context, or an app) of the user.

Figure 3:
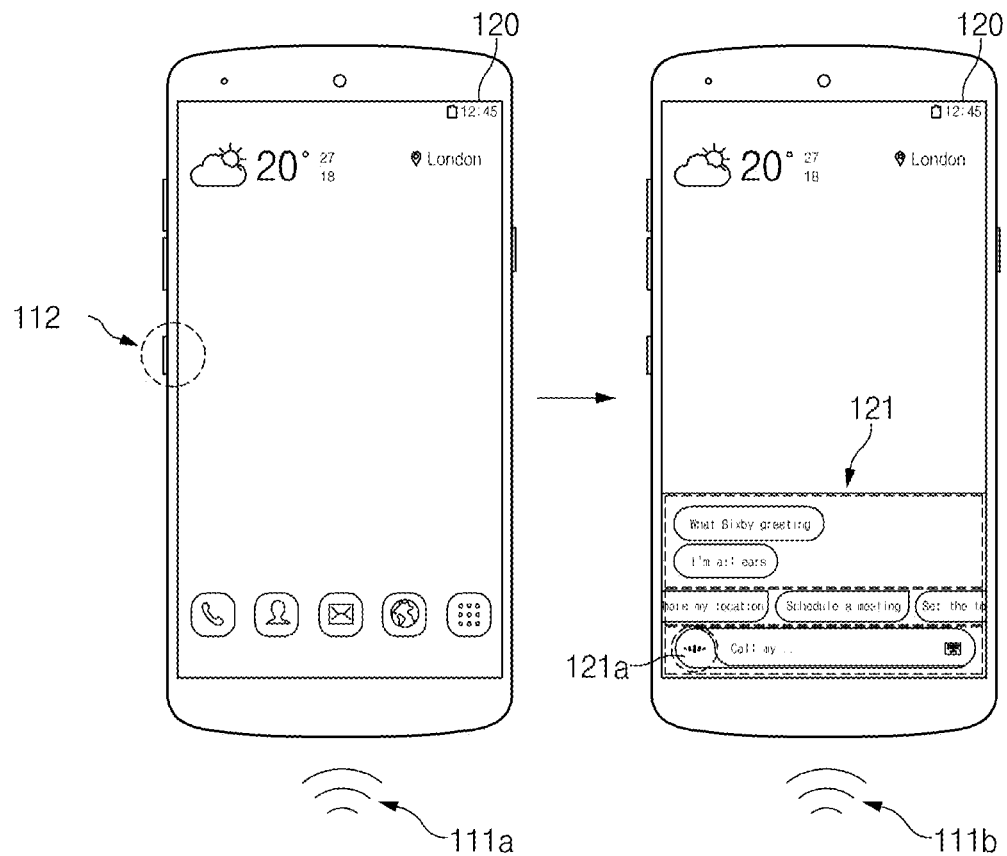
FIG. 3 illustrates execution of an intelligence app at a user terminal, according to some embodiments of the present disclosure.

FIG. 3 illustrates execution of an intelligence app of a user terminal, according to certain embodiments of the present disclosure.

In the non-limiting example of FIG. 3, the user terminal 100 receives a user input to execute an intelligence app (e.g., a speech recognition app) operating in conjunction with the intelligence agent 151.

According to some embodiments, the user terminal 100 may execute the intelligence app for recognizing a voice through a hardware key 112. For example, in the case where the user terminal 100 receives the user input through the hardware key 112, the user terminal 100 may display a UI 121 of the intelligence app in the display 120. For example, a user may touch a speech recognition button 121*a* of the UI 121 of the intelligence app for the purpose of entering a voice 113*b* in a state where the UI 121 of the intelligence app is displayed in the display 120. For another example, while continuously pressing the hardware key 112 to enter the voice 113*b*, the user may enter the voice 113*b*.

According to certain embodiments, the user terminal 100 may execute the intelligence app for recognizing a voice through the microphone 111. For example, in the case where a specified voice (e.g., wake up!) is entered 113a through the microphone 111, the user terminal 100 may display the UI 121 of the intelligence app in the display 120.

Figure 4:
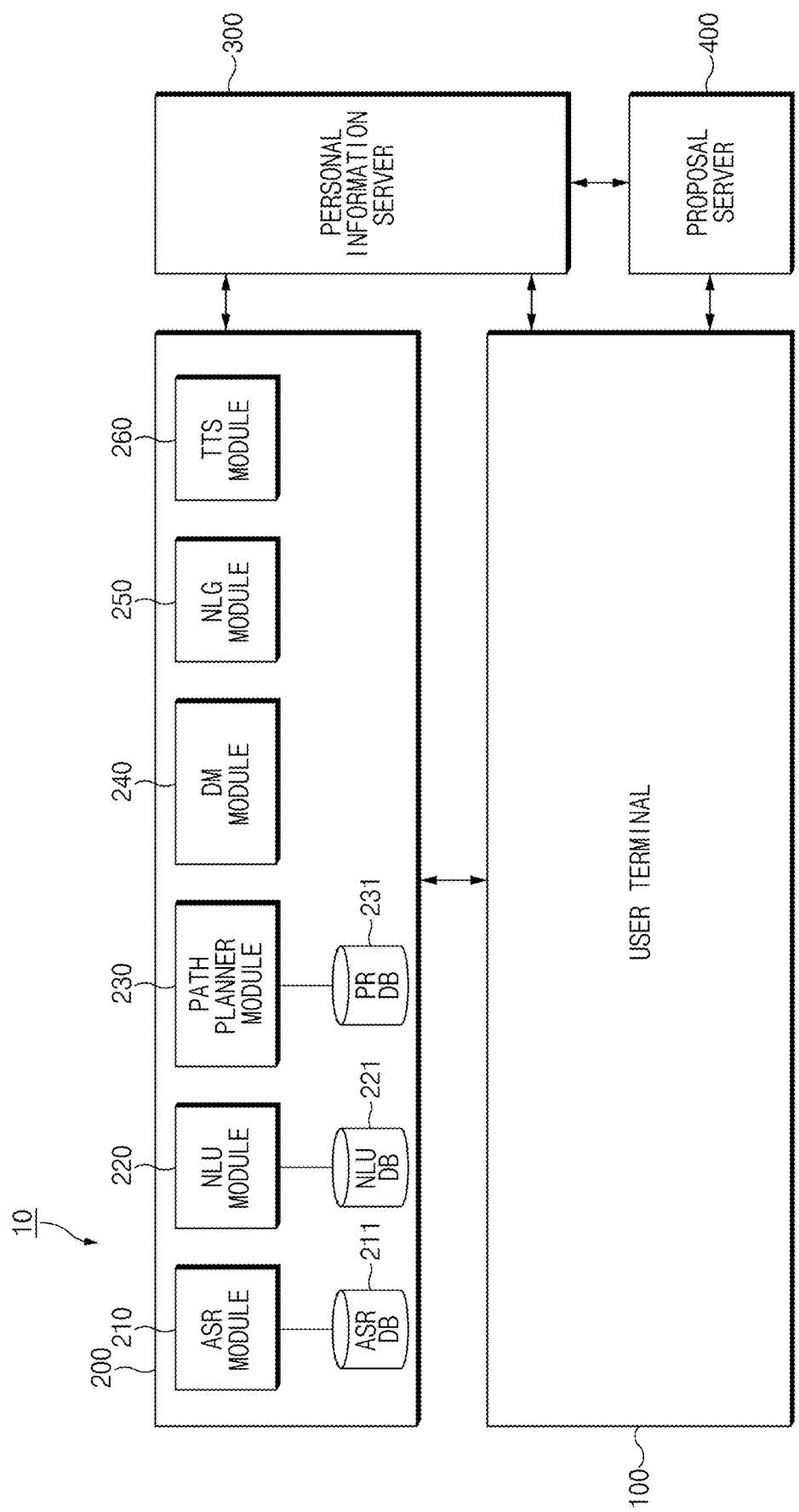
FIG. 4 illustrates, in block diagram format, an intelligence server of an integrated intelligent system, according to at least one embodiment of the present disclosure.

FIG. 4 illustrates in, block diagram format, an intelligence server of an integrated intelligent system, according to various embodiments of the present disclosure.

Referring to the non-limiting example of FIG. 4, the intelligence server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260.

The NLU module 220 or the path planner module 230 of the intelligence server 200 may generate a path rule.

According to some embodiments, the ASR module 210 may change the user input received from the user terminal 100 to text data.

For example, the ASR module 210 may include an utterance recognition module. The utterance recognition module may include an acoustic model and a language model. For example, the acoustic model may include information associated with utterance, and the language model may include unit phoneme information and information about a combination of unit phoneme information. The utterance recognition module may change user utterance to text data by using the information associated with utterance and unit phoneme information. For example, the information about the acoustic model and the language model may be stored in an automatic speech recognition database (ASR DB) 211.

According to some embodiments, the NLU module 220 may grasp, or realize user intent by performing syntactic analysis or semantic analysis. The syntactic analysis may divide the user input into syntactic units (e.g., words, phrases, morphemes, and the like) and determine which syntactic elements the divided units have. The semantic analysis may be performed by using semantic matching, rule matching, formula matching, or the like. As such, the NLU module 220 may obtain a domain, intent, or a parameter (or a slot) necessary for the user input to express the intent.

According to some embodiments, the NLU module 220 may determine the intent of the user and parameter by using a matching rule that is divided into a domain, intent, and a parameter (or a slot) necessary to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more necessary parameters. The matching rule may be stored in a natural language understanding database (NLU DB) 221.

According to at least one embodiment, the NLU module 220 may grasp the meaning of words extracted from a user input by using linguistic features (e.g., grammatical elements) such as morphemes, phrases, and the like and may match the meaning of the grasped words to the domain and intent to determine user intent. For example, the NLU module 220 may calculate how many words extracted from the user input is included in each of the domain and the intent, for the purpose of determining the user intent. According to an embodiment, the NLU module 220 may determine a parameter of the user input by using the words that are the basis for grasping the intent. According to certain embodiments, the NLU module 220 may determine the user intent by using the NLU DB 221 storing the linguistic features for grasping the intent of the user input. According to other embodiments, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to some embodiments, the ASR module 210 and the NLU module 220 may recognize the voice of the user with reference to the PLM stored in the NLU DB 221.

According to certain embodiments, the NLU module 220 may generate a path rule based on the intent of the user input and the parameter. For example, the NLU module 220 may select an app to be executed, based on the intent of the user input and may determine an action to be executed, in the selected app. The NLU module 220 may determine the parameter corresponding to the determined action to generate the path rule. According to at least one embodiment, the path rule generated by the NLU module 220 may include information about the app to be executed, the action to be executed in the app, and a parameter necessary to execute the action.

According to some embodiments, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set for the purpose of determining the path rule.

According to certain embodiments, the NLU module 220 may determine the app to be executed, the action to be executed in the app, and a parameter necessary to execute the action based on the intent of the user input and the parameter for the purpose of generating one path rule or a plurality of path rules. For example, the NLU module 220 may arrange the app to be executed and the action to be executed in the app by using information of the user terminal 100 depending on the intent of the user input in the form of ontology or a graph model for the purpose of generating the path rule. For example, the generated path rule may be stored in a path rule database (PR DB) 231 through the path planner module 230. The generated path rule may be added to a path rule set of the PR DB 231.

According to the non-limiting example of FIG. 4, the NLU module 220 may select at least one path rule of the generated plurality of path rules. For example, the NLU module 220 may select an optimal path rule of the plurality of path rules. For another example, in the case where only a part of action is specified based on the user utterance, the NLU module 220 may select a plurality of path rules. The NLU module 220 may determine one path rule of the plurality of path rules depending on an additional input of the user.

According to at least one embodiment, the NLU module 220 may transmit the path rule to the user terminal 100 in response to a request for the user input. For example, the NLU module 220 may transmit one path rule corresponding to the user input to the user terminal 100. In another example, the NLU module 220 may transmit the plurality of path rules corresponding to the user input to the user terminal 100. For example, in the case where only a part of action is specified based on the user utterance, the plurality of path rules may be generated by the NLU module 220.

According to certain embodiments, the path planner module 230 may select at least one path rule of the plurality of path rules.

According to certain embodiments, the path planner module 230 may transmit a path rule set including the plurality of path rules to the NLU module 220. The plurality of path rules of the path rule set may be stored in the PR DB 231 connected to the path planner module 230 in the table form. For example, the path planner module 230 may transmit a path rule set corresponding to information (e.g., OS information or app information) of the user terminal 100, which is received from the intelligence agent 151, to the NLU module 220. For example, a table stored in the PR DB 231 may be stored for each domain or for each version of the domain.

According to certain embodiments, the path planner module 230 may select one path rule or the plurality of path rules from the path rule set to transmit the selected one path rule or the selected plurality of path rules to the NLU module 220. For example, the path planner module 230 may match the user intent and the parameter to the path rule set corresponding to the user terminal 100 to select one path rule or a plurality of path rules and may transmit the selected one path rule or the selected plurality of path rules to the NLU module 220.

According to some embodiments, the path planner module 230 may generate the one path rule or the plurality of path rules by using the user intent and the parameter. For example, the path planner module 230 may determine the app to be executed and the action to be executed in the app based on the user intent and the parameter for the purpose of generating the one path rule or the plurality of path rules. According to an embodiment, the path planner module 230 may store the generated path rule in the PR DB 231.

According to various embodiments, the path planner module 230 may store the path rule generated by the NLU module 220 in the PR DB 231. The generated path rule may be added to the path rule set stored in the PR DB 231.

According to certain embodiments, the table stored in the PR DB 231 may include a plurality of path rules or a plurality of path rule sets. The plurality of path rules or the plurality of path rule sets may reflect the kind, version, type, or characteristic of a device performing each path rule.

According to some embodiments, the DM module 240 may determine whether the user intent grasped by the NLU module 220 is clear. For example, the DM module 240 may determine whether the user intent is clear, based on whether the information of a parameter is sufficient. The DM module 240 may determine whether the parameter grasped by the NLU module 220 is sufficient to perform a task. According to an embodiment, in the case where the user intent is not clear, the DM module 240 may perform a feedback for making a request for necessary information to the user. For example, the DM module 240 may perform a feedback for making a request for information about the parameter for grasping the user intent.

According to certain embodiments, the DM module 240 may include a content provider module. In the case where the content provider module executes an action based on the intent and the parameter grasped by the NLU module 220, the content provider module may generate the result obtained by performing a task corresponding to the user input. According to some embodiments, the DM module 240 may transmit the result generated by the content provider module as the response to the user input to the user terminal 100.

According to various embodiments, the natural language generating module NLG 250 may change specified information to a text form. Information changed to the text form may be a form of a natural language utterance. For example, the specified information may be information about an additional input, information for guiding the completion of an action corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to some embodiments, the TTS module 260 may change information of the text form to information of a voice form. The TTS module 260 may receive the information of the text form from the NLG module 250, may change the information of the text form to the information of a voice form, and may transmit the information of the voice form to the user terminal 100. The user terminal 100 may output the information of the voice form to the speaker 130.

According to the non-limiting example of FIG. 4, the NLU module 220, the path planner module 230, and the DM module 240 may be implemented with one module. For example, the NLU module 220, the path planner module 230 and the DM module 240 may be implemented with one module, may determine the user intent and the parameter, and may generate a response (e.g., a path rule) corresponding to the determined user intent and parameter. As such, the generated response may be transmitted to the user terminal 100.

Figure 5:
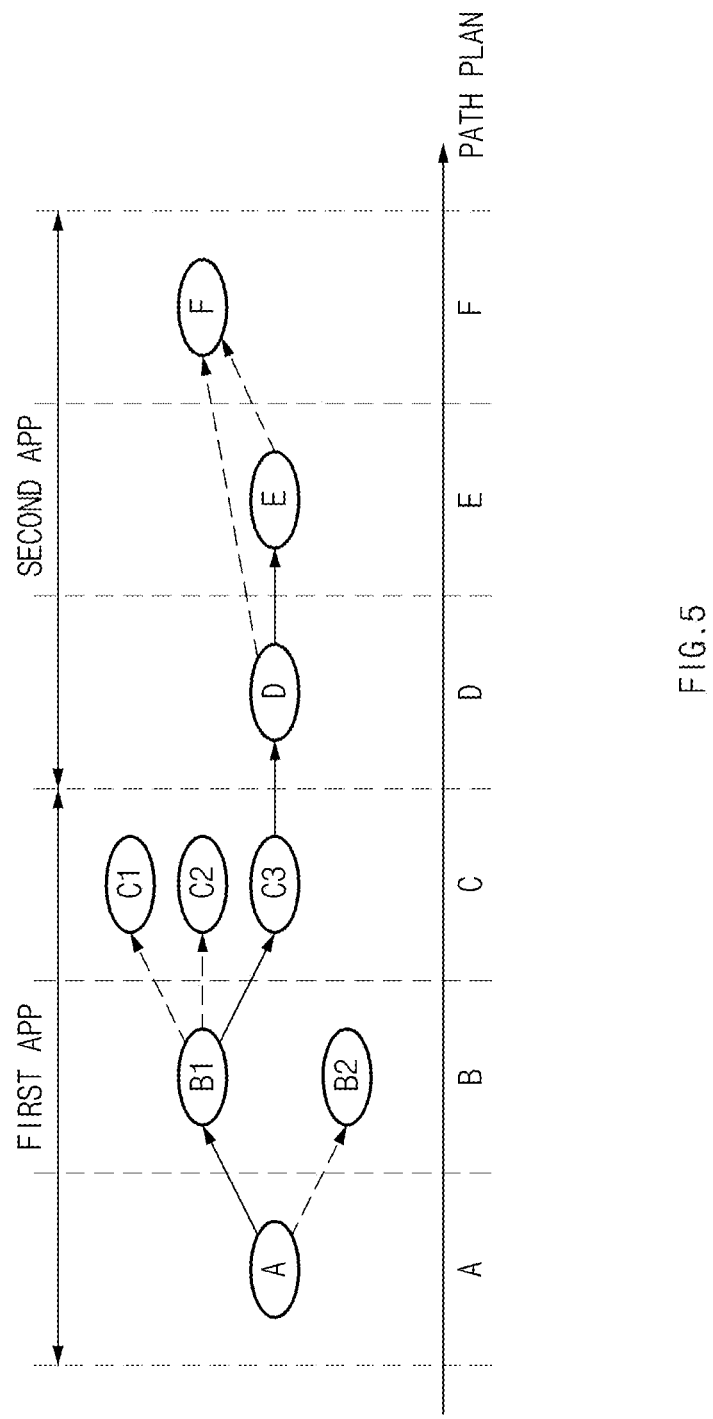
FIG. 5 illustrates a path rule generating method of a natural language understanding (NLU), according to certain embodiments of the present disclosure.

FIG. 5 illustrates a path rule generating method of a path planner module, according to various embodiments of the present disclosure.

Referring to the non-limiting example of FIG. 5, according to some embodiments, the NLU module 220 may divide the function of an app into unit actions (e.g., A to F) and may store the divided unit actions in the PR DB 231. For example, the NLU module 220 may store a path rule set, which includes a plurality of path rules A-B1-C1, A-B1-C2, A-B1-C3-D-F, and A-B1-C3-D-E-F divided into unit actions, in the PR DB 231.

According to various embodiments, the PR DB 231 of the path planner module 230 may store the path rule set for performing the function of an app. The path rule set may include a plurality of path rules each of which includes a plurality of actions. An action executed depending on a parameter input to each of the plurality of actions may be sequentially arranged in the plurality of path rules. According to at least one embodiment, the plurality of path rules implemented in a form of ontology or a graph model may be stored in the PR DB 231.

According to various embodiments, the NLU module 220 may select an optimal path rule A-B1-C3-D-F of the plurality of path rules A-B1-C1, A-B1-C2, A-B1-C3-D-F, and A-B1-C3-D-E-F corresponding to the intent of a user input and the parameter.

According to some embodiments, where there is no path rule completely matched to the user input, the NLU module 220 may transmit a plurality of rules to the user terminal 100. For example, the NLU module 220 may select a path rule (e.g., A-B1) partly corresponding to the user input. The NLU module 220 may select one or more path rules (e.g., A-B1-C1, A-B1-C2, A-B1-C3-D-F, and A-B1-C3-D-E-F) including the path rule (e.g., A-B1) partly corresponding to the user input and may transmit the one or more path rules to the user terminal 100.

According to at least one embodiment, the NLU module 220 may select one of a plurality of path rules based on an input added by the user terminal 100 and may transmit the selected one path rule to the user terminal 100. For example, the NLU module 220 may select one path rule (e.g., A-B1-C3-D-F) of the plurality of path rules (e.g., A-B1-C1, A-B1-C2, A-B1-C3-D-F, and A-B1-C3-D-E-F) depending on the user input (e.g., an input for selecting C3) additionally entered by the user terminal 100 for the purpose of transmitting the selected one path rule to the user terminal 100.

According to other embodiments, the NLU module 220 may determine the intent of a user and the parameter corresponding to the user input (e.g., an input for selecting C3) additionally entered by the user terminal 100 for the purpose of transmitting the user intent or the parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

As such, in the non-limiting example of FIG. 5, the user terminal 100 may complete the actions of the apps 141 and 143 based on the selected one path rule.

According to certain embodiments, in the case where a user input in which information is insufficient is received by the intelligence server 200, the NLU module 220 may generate a path rule partly corresponding to the received user input. For example, the NLU module 220 may transmit the partly corresponding path rule to the intelligence agent 151. The intelligence agent 151 may transmit the partly corresponding path rule to the execution manager module 153, and the execution manager module 153 may execute the first app 141 depending on the path rule. The execution manager module 153 may transmit information about an insufficient parameter to the intelligence agent 151 while executing the first app 141. The intelligence agent 151 may make a request for an additional input to a user by using the information about the insufficient parameter. If the additional input is received by the user, the intelligence agent 151 may transmit and process the additional input to the intelligence server 200. The NLU module 220 may generate a path rule to be added, based on the intent of the user input additionally entered and parameter information and may transmit the path rule to be added, to the intelligence agent 151. The intelligence agent 151 may transmit the path rule to the execution manager module 153 and may execute the second app 143.

According to various embodiments, in the case where a user input, in which a portion of information is missed, is received by the intelligence server 200, the NLU module 220 may transmit a user information request to the personal information server 300. The personal information server 300 may transmit information of a user entering the user input stored in a persona database to the NLU module 220. The NLU module 220 may select a path rule corresponding to the user input in which a part of an action is missed, by using the user information. As such, even though the user input in which a portion of information is missed is received by the intelligence server 200, the NLU module 220 may make a request for the missed information to receive an additional input or may determine a path rule corresponding to the user input by using user information.

Figure 6:
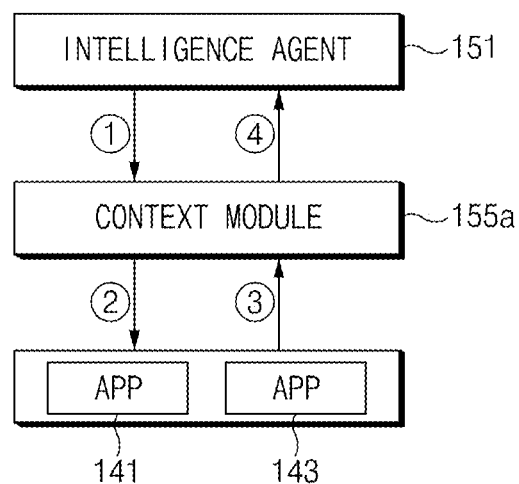
FIG. 6 illustrates, in block diagram format, a context module of a processor collecting a current state, according to certain embodiments of the present disclosure.

FIG. 6 illustrates, in block diagram format, a context module of a processor collects a current state, according to an embodiment of the present disclosure.

Referring to FIG. 6, if receiving a context request from the intelligence agent 151 (shown by the arrow numbered ①), the context module 155a may make a request for context information indicating current states of the apps 141 and 143 to the apps 141 and 143 (as shown by the arrow numbered ②). According to some embodiments, the context module 155a may receive the context information from the apps 141 and 143 (shown by the arrow numbered ③) and may transmit the context information to the intelligence agent 151 (as shown by the arrow numbered ④).

According to some embodiments, the context module 155a may receive pieces of context information through the apps 141 and 143. For example, the context information may be information about the most recently executed apps 141 and 143. For another example, the context information may be information (e.g., information about the corresponding picture in the case where a user watches a picture through a gallery app) about the current states in the apps 141 and 143.

According to various embodiments, the context module 155a may receive context information indicating a current state of the user terminal 100 from a device platform as well as the apps 141 and 143. The context information may include general context information, user context information, or device context information.

In the non-limiting example of FIG. 6, general context information may include general information of the user terminal 100. The general context information may be verified through an internal algorithm by receiving data through a sensor hub of the device platform or the like. For example, the general context information may include information about current time and space. For example, the information about the current time and space may include information about current time or a current location of the user terminal 100. The current time may be verified through the time on the user terminal 100, and the information about the current location may be verified through a global positioning system (GPS). For another example, the general context information may include information about physical motion. For example, the information about the physical motion may include information about walking, running, driving, or the like. The information about the physical motion may be verified through a motion sensor. In the case of the information about driving, the boarding and the parking may be verified by sensing Bluetooth connection in a vehicle as well as the driving is verified through the motion sensor. For another example, the general context information may include user activity information. For example, the user activity information may include information about commuting, shopping, travel, or the like. The user activity information may be verified by using information about a place where a user or an app registers in a database.

According to certain embodiments, user context information may include information about the user. For example, the user context information may include information about an emotional state of the user. For example, the information about the emotional state of the user may include information about happiness, sadness, anger, or the like of the user. For another example, the user context information may include information about the current state of the user. For example, the information about the current state of the user may include information about interest, intent, or the like (e.g., shopping).

The device context information may include information about the state of the user terminal 100. For example, the device context information may include information about a path rule that the execution manager module 153 performs. As another example, the device information may include information about a battery. For example, the information about the battery may be verified through charging and discharging states of the battery. In still another example, the device information may include information about a connected device and a network. For example, the information about the connected device may be verified through a communication interface connected with the device.

Figure 7:
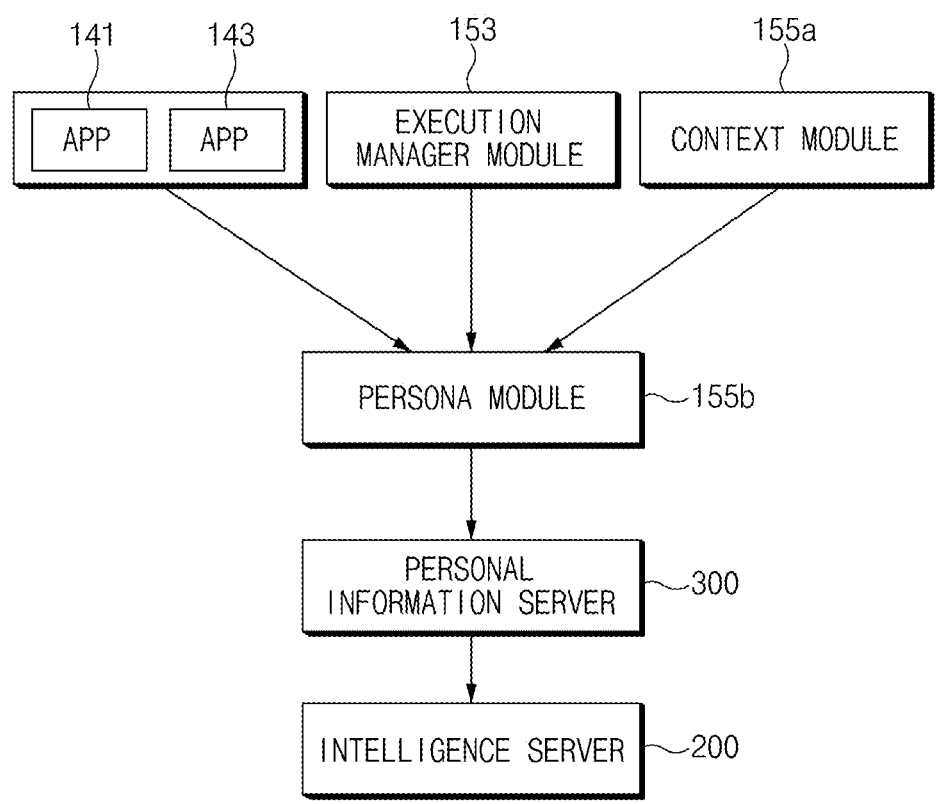
FIG. 7 illustrates a persona module managing information of a user, according to some embodiments of the present disclosure.

FIG. 7 illustrates a persona module managing information of a user, according to some embodiments of the present disclosure.

Referring to the non-limiting example of FIG. 7, the persona module 155b may receive information of the user terminal 100 from the apps 141 and 143, the execution manager module 153, or the context module 155a. The apps 141 and 143 and the execution manager module 153 may store information about the result obtained by executing the actions 141b and 143b of an app in an action log database. The context module 155a may store information about a current state of the user terminal 100 in a context database. The persona module 155b may receive the stored information from the action log database or the context database. For example, data stored in the action log database and the context database may be analyzed by an analysis engine and may be transmitted to the persona module 155b.

According to at least one embodiment, the persona module 155b may transmit information received from the apps 141 and 143, the execution manager module 153, or the context module 155a to the proposal module 155c. For example, the persona module 155b may transmit the data stored in the action log database or the context database to the proposal module 155c.

According to some embodiments, the persona module 155b may transmit the information received from the apps 141 and 143, the execution manager module 153, or the context module 155a to the personal information server 300. For example, the persona module 155b may periodically transmit the data, which is accumulated and stored in the action log database or the context database, to the personal information server 300.

According to certain embodiments, the persona module 155b may transmit the data stored in the action log database or the context database to the proposal module 155c. User information generated by the persona module 155b may be stored in a persona database. The persona module 155b may periodically transmit the user information stored in the persona database to the personal information server 300. According to an embodiment, the information transmitted to the personal information server 300 by the persona module 155b may be stored in the persona database. The personal information server 300 may estimate user information necessary to generate a path rule of the intelligence server 200 by using the information stored in the persona database.

According to various embodiments, the user information estimated by using information that the persona module 155b transmits may include profile information or preference information. The profile information or the preference information may be estimated through an account of the user and accumulated information.

The profile information may include personal information of the user. For example, the profile information may include population statistics information of the user. For example, the population statistics information may include gender, age, or the like of the user. For another example, the profile information may include life event information. For example, the life event information may be estimated by comparing log information with a life event model and may be strengthened by analyzing a behavior pattern. For another example, the profile information may include interest information. For example, the interest information may include shopping items of interest, interesting fields (e.g., sports, politics, and the like). For another example, the profile information may include activity area information. For example, the activity area information may include information about a house, a work place, or the like. The information about the activity area may include information about an area where a priority is recorded based on accumulated stay time and the number of visits as well as information about a location of a place. For another example, the profile information may include activity time information. For example, the activity time information may include information about a wakeup time, a commute time, a sleep time, or the like. The information about the commute time may be estimated by using the activity area information (e.g., information about a house and a work place). The information about the sleep time may be estimated through an unused time of the user terminal 100.

The preference information may include preference information of the user. For example, the preference information may include information about app preference. For example, the app preference may be estimated through a usage log (e.g., a time- and place-specific usage log) of an app. The app preference may be used to determine an app to be executed depending on a current state (e.g., time or place) of the user. In another example, the preference information may include information about contact preference. For example, the contact preference may be estimated by analyzing information about a contact frequency (e.g., a time- and place-specific frequency of contacting) of a contact. The contact preference may be used to determine a contact to be contacted depending on a current state (e.g., a contact for duplicate names) of the user. For another example, the preference information may include setting information. For example, the setting information may be estimated by analyzing information about setting frequency (e.g., a time- and place-specific frequency of setting a setting value) of a specific setting value. The setting information may be used to set a specific setting value depending on the current state (e.g., a time, a place, or context) of the user. For another example, the preference information may include place preference. For example, the place preference may be estimated through visit history (e.g., a time-specific visit history) of a specific place. The place preference may be used to determine a place to visit depending on the current state (e.g., time) of the user. According to another example, the preference information may include instruction preference. For example, the instruction preference may be estimated through a usage frequency (e.g., a time- and place-specific usage frequency) of an instruction. The instruction preference may be used to determine an instruction pattern to be used depending on the current state (e.g., time or place) of the user. In particular, the instruction preference may include information about a menu most frequently selected by the user in the current state of an app being executed by analyzing the log information.

Figure 8:
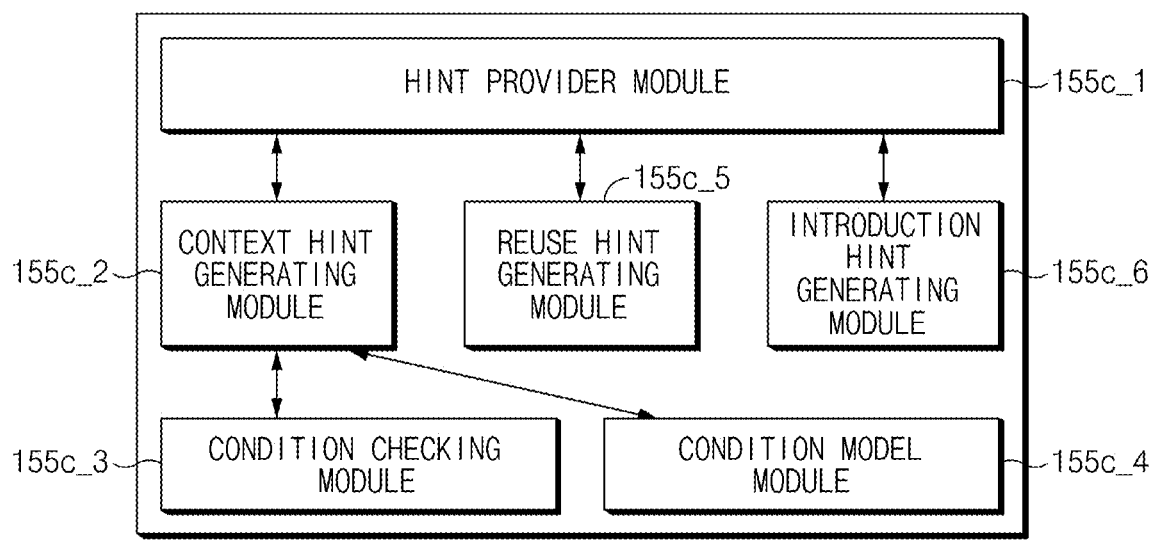
FIG. 8 illustrates in block diagram format, a proposal module, according to certain embodiments of the present disclosure.

FIG. 8 illustrates, in block diagram format, a proposal module according to certain embodiments of the present disclosure.

Referring to the non-limiting example of FIG. 8, the proposal module 155c may include a hint provider module 155c_1, a context hint generating module 155c_2, a condition checking module 155c_3, a condition model module 155c_4, a reuse hint generating module 155c_5, or an introduction hint generating module 155c_6.

According to some embodiments, the hint provider module 155c_1 may provide a user with a hint. For example, the hint provider module 155c_1 may receive the generated hint from the context hint generating module 155c_2, the reuse hint generating module 155c_5, or the introduction hint generating module 155c_6, to provide the user with the hint.

According to at least one embodiment, the context hint generating module 155c_2 may generate a hint that is recommended depending on a current state through the condition checking module 155c_3 or the condition model module 155c_4. The condition checking module 155c_3 may receive information corresponding to the current state through the intelligence service module 155, and the condition model module 155c_4 may set a condition model by using the received information. For example, the condition model module 155c_4 may provide the user with a hint, which is likely to be used under the corresponding condition, in order of priority by determining a time, a location, context, an app being executed, or the like at a point in time when the hint is provided to the user.

According to various embodiments, the reuse hint generating module 155c_5 may generate a hint that is to be recommended depending on the current state and use frequency. For example, the reuse hint generating module 155c_5 may generate the hint in consideration of the use pattern of the user.

According to some embodiments, the introduction hint generating module 155c_6 may generate a hint for introducing a new function and a function, which is heavily utilized by another user, to the user. For example, the hint for introducing the new function may include introduction (e.g., an operating method) associated with the intelligence agent 151.

According to various embodiments, the personal information server 300 may include the context hint generating module 155c_2, the condition checking module 155c_3, the condition model module 155c_4, the reuse hint generating module 155c_5, or the introduction hint generating module 155c_6 of the proposal module 155c. For example, the hint provider module 155c_1 of the proposal module 155c may receive the hint from the context hint generating module 155c_2, the reuse hint generating module 155c_5, or the introduction hint generating module 155c_6 of the personal information server 300 to provide the user with the received hint.

According to certain embodiments, the user terminal 100 may provide the hint depending on the following series of processes. For example, if receiving a hint providing request from the intelligence agent 151, the hint provider module 155c_1 may transmit a hint generating request to the context hint generating module 155c_2. If receiving the hint generating request, the context hint generating module 155c_2 may receive information corresponding to the current state from the context module 155a and the persona module 155b by using the condition checking module 155c_3. The condition checking module 155c_3 may transmit the received information to the condition model module 155c 4, and the condition model module 155c_4 may assign a priority to a hint among hints to be provided to the user, in order of high availability under a condition by using the information. The context hint generating module 155c_2 may verify the condition and may generate a hint corresponding to the current state. The context hint generating module 155c_2 may transmit the generated hint to the hint provider module 155c_1. The hint provider module 155c_1 may sort the hint depending on the specified rule and may transmit the hint to the intelligence agent 151.

According to some embodiments, the hint provider module 155c 1 may generate a plurality of context hints and may assign priorities to the plurality of context hints depending on the specified rule. According to at least one embodiment, the hint provider module 155c_1 may provide the user with a context hint, the priority of which is high, from among the plurality of context hints at first.

According to some embodiments, the user terminal 100 may propose a hint according to the use frequency. For example, if receiving a hint providing request from the intelligence agent 151, the hint provider module 155c_1 may transmit a hint generating request to the reuse hint generating module 155c_5. If receiving the hint generating request, the reuse hint generating module 155c_5 may receive user information from the persona module 155b. For example, the reuse hint generating module 155c_5 may receive a path rule included in preference information of the user of the persona module 155b, a parameter included in the path rule, an execution frequency of an app, and information about time and space in which the app is used. The reuse hint generating module 155c_5 may generate a hint corresponding to the received user information. The reuse hint generating module 155c_5 may transmit the generated hint to the hint provider module 155c_1. The hint provider module 155c_1 may sort the hint and may transmit the hint to the intelligence agent 151.

According to some embodiments, the user terminal 100 may propose a hint associated with a new function. For example, if receiving a hint providing request from the intelligence agent 151, the hint provider module 155c_1 may transmit a hint generating request to the introduction hint generating module 155c_6. The introduction hint generating module 155c_6 may transmit an introduction hint providing request to the proposal server 400 and may receive information about a function to be introduced, from the proposal server 400. For example, the proposal server 400 may store the information about the function to be introduced, and a hint list associated with the function to be introduced may be updated by a service operator. The introduction hint generating module 155c_6 may transmit the generated hint to the hint provider module 155c_1. The hint provider module 155c_1 may sort the hint and may transmit the hint to the intelligence agent 151.

As such, the proposal module 155c may provide a user with a hint generated by the context hint generating module 155c_2, the reuse hint generating module 155c_5, or the introduction hint generating module 155c_6. For example, the proposal module 155c may display the generated hint in an app operating the intelligence agent 151 and may receive an input for selecting the hint from the user through the app.

Hereinafter, a configuration of a user terminal that provides a hint by using a notification will be described with reference to the non-limiting example of FIG. 9.

Figure 9:
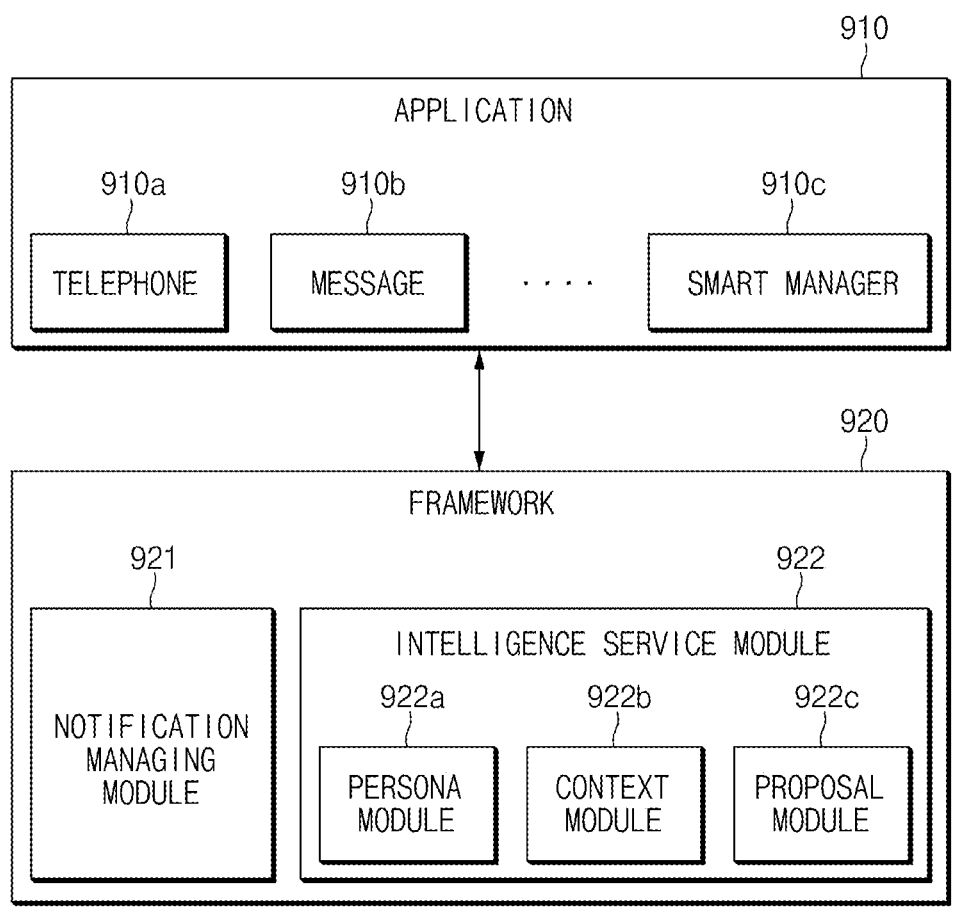
FIG. 9 illustrates in block diagram format, an application and a framework at a user terminal, according to some embodiments of the present disclosure.

FIG. 9 illustrates in block diagram format, an application 910 and a framework 920 that the user terminal 100 includes, according to some embodiments of the present disclosure.

Referring to FIG. 9, the user terminal 100 may include the application 910 and the framework 920. Although not illustrated in FIG. 9, the application 910 and the framework 920 may operate in concert with elements provided natively to the above-described user terminal 100.

According to some embodiments of the present disclosure, the application 910 may transmit a notification event generated by the application 910 to the framework 920 and may correspond to the app 141 or 143 of FIG. 2, as a program that is stored in the memory 140 of the user terminal 100 and is capable of being executed by a processor. According to an embodiment, the application 910 may include a telephone 910a, a message 910b, a smart manager 910c, or the like.

According to some embodiments of the present disclosure, the framework 920 may include a notification managing module 921, an intelligence service module 922, or the like.

According to certain embodiments of the present disclosure, the notification managing module 921 may receive a notification event generated by the user terminal 100 to generate a notification object, may transmit the notification object to a proposal module 922c, and may display notification context in a notification bar. For example, the notification managing module 921 may receive the notification event generated by the application 910.

According to certain embodiments, the notification object may include a parameter in which a notification ID of the notification object is defined, an icon parameter in which an icon displayed in the notification bar is defined, a title parameter in which a title displayed in the notification bar is defined, a text parameter in which a text displayed in the notification bar is defined, a pending intent parameter in which a task to be executed if the notification object displayed in the notification bar is selected is defined, or the like.

According to various embodiments, a task defined in the pending intent parameter may be a task associated with a notification, and a plurality of tasks may be defined in the pending intent parameter. For example, the pending intent parameter that a text message notification object includes may define a task to launch a text message app, a task to execute a response operation, or the like.

According to at least one embodiment of the present disclosure, the intelligence service module 922 may include a persona module 922a, a context module 922b, the proposal module 922c, or the like. According to various embodiments of the present disclosure, the persona module 922a may manage personal information of a user that utilizes the user terminal 100 and may correspond to the persona module 155b of FIG. 2. For example, the persona module 922a may collect the use information and the execution result of the user terminal 100 to manage the personal information of the user.

According to some embodiments of the present disclosure, the context module 922b may collect the current state of the application 910 or a device platform from the application 910 or the device platform and may return the collected current state to an intelligence agent; and the context module 922b may correspond to the context module 155a of FIG. 2. For example, the context module 922b may receive context information indicating the current state of an app to collect the current state of the app.

According to some embodiments of the present disclosure, the proposal module 922c may predict the intent of the user to recommend an instruction to the user; and the proposal module 922c may correspond to the proposal module 155c of FIG. 2. For example, the proposal module 922c may recommend the instruction to the user in consideration of the current state (e.g., a time, a place, context, or an app) of the user. According to an embodiment, the instruction that the proposal module 922c recommends may be used as a hint that allows the user to execute a specific function.

According to at least one embodiment of the present disclosure, for the purpose of providing a hint by using a notification, the hint needs to be generated based on the notification context and an action to be executed when the hint has been selected needs to be defined. Hereinafter, a configuration of a proposal module that generates a hint by using a notification will be described with reference to FIG. 10.

Figure 10:
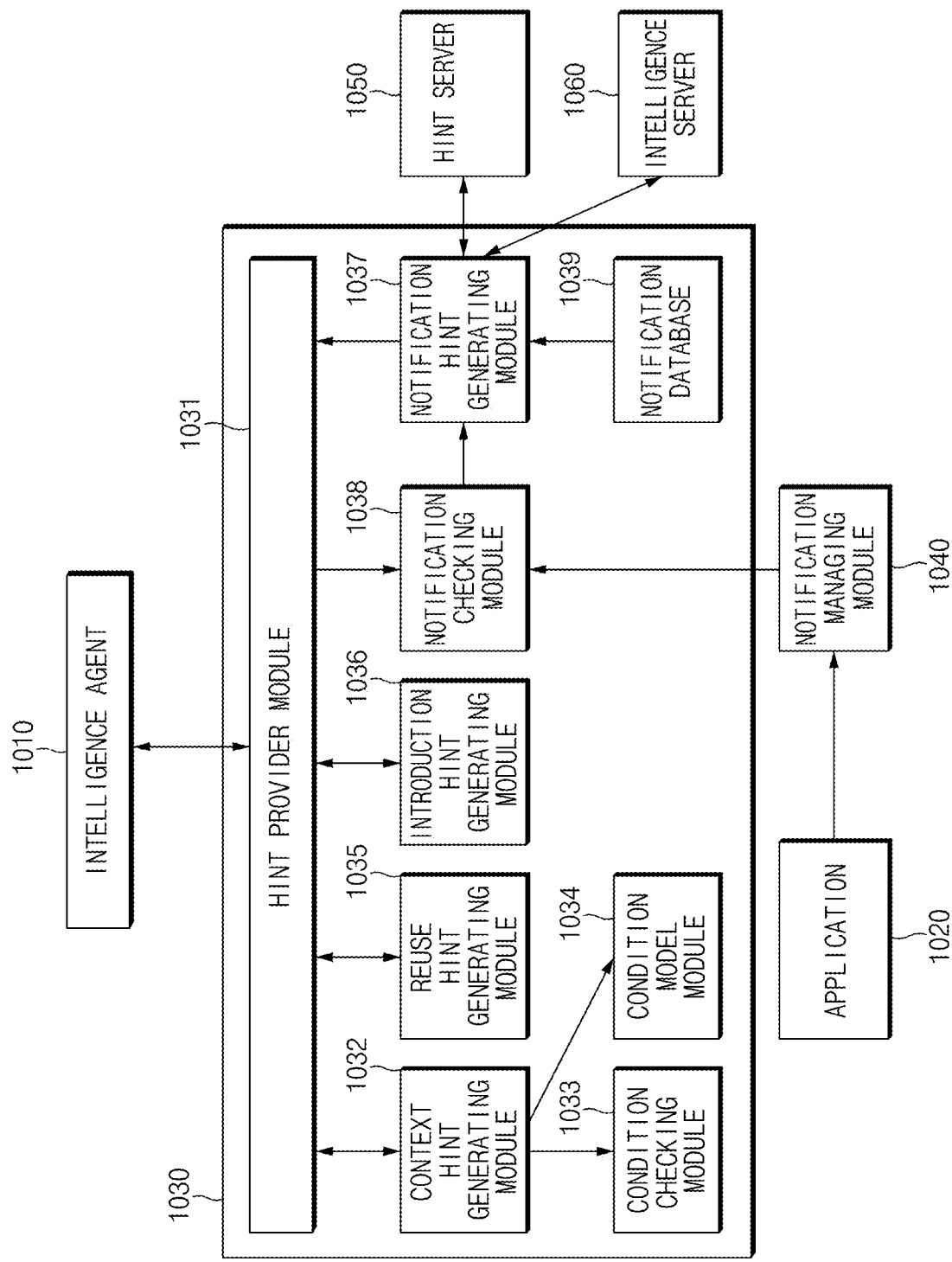
FIG. 10 illustrates, in block diagram format, a proposal module, according to certain embodiments of the present disclosure.

FIG. 10 illustrates, in block diagram format, a proposal module, according to various embodiments of the present disclosure.

Referring to the non-limiting example of FIG. 10, a proposal module 1030 may be connected to an intelligence agent 1010 or a notification managing module 1040. The proposal module 1030 may generate a hint by using a notification received from the notification managing module 1040 and may provide the generated hint to the intelligence agent 1010.

According to certain embodiments, the proposal module 1030 may include a hint provider module 1031, a context hint generating module 1032, a condition checking module 1033, a condition model module 1034, a reuse hint generating module 1035, an introduction hint generating module 1036, a notification hint generating module 1037, a notification checking module 1038, or a notification database 1039.

According to at least one embodiment of the present disclosure, the hint provider module 1031 may correspond to the hint provider module 155c_1 of FIG. 8 and may provide a user with a hint. For example, the hint provider module 1031 may receive the hint generated from the context hint generating module 1032, the reuse hint generating module 1035, the introduction hint generating module 1036, or the notification hint generating module 1037 to provide the user with the hint.

According to the non-limiting example of FIG. 10, the context hint generating module 1032 may correspond to the context hint generating module 155c_2 of FIG. 8 and may generate a hint that is to be recommended depending on the current state through the condition checking module 1033 and the condition model module 1034. The condition checking module 1033 may receive information corresponding to the current state through the context module 922b or the persona module 922a of the intelligence service module 922, and the condition model module 1034 may set a condition model by using the received information. For example, the condition model module 1034 may provide the user with a hint, which is likely to be used under the corresponding condition, in order of priority by determining a time, a location, context, an app being executed, or the like at a point in time when the hint is provided to the user.

According to various embodiments of the present disclosure, the reuse hint generating module 1035 may correspond to the reuse hint generating module 155c_5 of FIG. 8 and may generate a hint, which is to be recommended depending on the current state, a use frequency, or a use history. For example, the reuse hint generating module 1035 may generate the hint in consideration of the use pattern of the user.

According to certain embodiments of the present disclosure, the introduction hint generating module 1036 may correspond to the introduction hint generating module 155c_6 of FIG. 8 and may generate a hint for introducing a new function and a function, which is heavily utilized by another user, to the user. For example, the hint for introducing the new function may include the introduction (e.g., an operating method) of the intelligence agent.

According to some embodiments of the present disclosure, the notification checking module 1038 may store a notification object received from the notification managing module 1040 during a specific time. According to at least one embodiment, if the specific time elapses, the notification checking module 1038 may delete the stored notification object. The notification checking module 1038 may transmit the stored notification object to the notification hint generating module 1037 in response to the request of the hint provider module 1031.

According to various embodiments of the present disclosure, the notification hint generating module 1037 may generate the hint based on the notification object, by using the notification checking module 1038 or the notification database 1039. The notification hint generating module 1037 may parse the notification object received from the notification checking module 1038 to transmit a notification object parameter to a hint server 1050 and may receive a task from the hint server 1050. The non-limiting example of FIG. 10 shows that the hint server 1050 and an intelligence server 1060 are separate servers. However, according to various embodiments, the intelligence server 1060 may include the hint server 1050. According to various embodiments, in the case where the intelligence server 1060 includes the hint server 1050, the notification hint generating module 1037 may parse the notification object received from the notification checking module 1038 to transmit the notification object parameter to the intelligence server 1060 and may receive a task from the intelligence server 1060.

According to some embodiments, the notification hint generating module 1037 may receive information associated with the state of the user terminal and may select at least part of tasks received from the hint server 1050, by using the information associated with the state of the user terminal.

According to certain embodiments of the present disclosure, the notification database 1039 may store information about a notification capable of being generated by a terminal. For example, the notification database 1039 may store a notification object ID, a hint message corresponding to the notification object ID, or a task executed when a hint corresponding to the notification object ID is selected. According to some embodiments, the notification database 1039 may store one set which is composed of the notification object ID, the hint message, and the task. In other words, each of the hint message and the task may correspond to the notification object ID. According to an embodiment, the notification database 1039 may store a plurality of sets each of which is composed of the notification object ID, the hint message, and the task.

According to various embodiments of the present disclosure, the notification database 1039 may store a plurality of tasks. According to some embodiments, the plurality of tasks may include a plurality of sets of tasks each of which includes one or more tasks. According to some embodiments, sets of tasks may correspond to domains, respectively. According to at least one embodiment, each of the domains may correspond to an application program.

For example, the plurality of tasks may include a first set of tasks including one or more tasks associated with the transmission or reception of a message and a second set of tasks including one or more tasks associated with the search. According to some embodiments, the first set of tasks may correspond to a message transmitting/receiving domain, and the second set of tasks set may correspond to a search domain. According to various embodiments, the message transmitting/receiving domain may correspond to a message application program, and the search domain may correspond to an Internet application program.

According to at least one embodiment of the present disclosure, the notification database 1039 may be managed by an external server, and may periodically receive information about a notification from the external server.

According to certain embodiments of the present disclosure, the notification database 1039 may be managed by an electronic device itself. In the case where the notification database 1039 is managed by the electronic device itself, the notification database 1039 may store the notification information associated with the preloaded application at a point in time when the electronic device is manufactured. In the case where a new application is installed in the electronic device, the electronic device may update notification information associated with the new application in the notification database 1039 at a point in time when the new application is installed.

According to various embodiments of the present disclosure, the notification managing module 1040 may receive a notification event from an application 1020 or the inside of the electronic device to provide a notification object associated with the notification event to the notification checking module 1038.

Hereinafter, a method in which a user terminal generates a hint by using a notification will be described with reference to the non-limiting example of FIG. 11.

Figure 11:
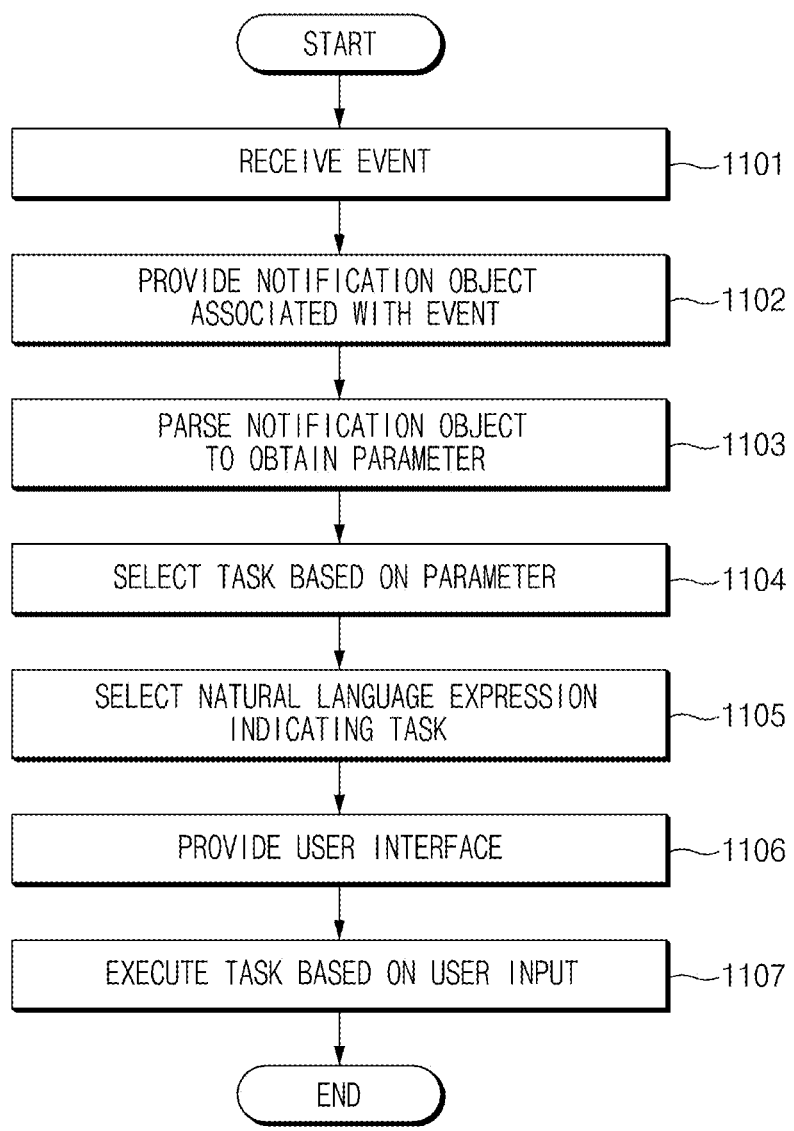
FIG. 11 is a flowchart illustrating operations of a method of providing a hint by using a notification, according to some embodiments of the present disclosure.

FIG. 11 is a flowchart illustrating operations of a method of providing a hint by using a notification, according to some embodiments of the present disclosure.

In operation 1101, the notification managing module 1040 may receive a notification event from the application 1020.

According to some embodiments, the notification event may be a notification event that the application 1020 receives from the outside of a user terminal through a wireless communication circuit. For example, the notification event received from the outside of the user terminal may include a notification event associated with the reception of a call, a short message, an instant message, or the like.

According to various embodiments, the notification event may be a notification event generated from the inside of the user terminal. For example, the notification event generated from the inside of a user terminal may include a notification event associated with the power management, memory state, security, or the like of the user terminal.

In operation 1102, the notification managing module 1040 may provide a notification object associated with the notification event to the notification checking module 1038. According to certain embodiments, the notification checking module 1038 may store the notification object received during a specific time and may transmit the notification object to the notification hint generating module 1037.

In operation 1103, the notification hint generating module 1037 may parse the notification object received from the notification checking module 1038 to obtain one or more parameters. According to some embodiments, the intelligence agent 1010 may request the hint provider module 1031 to generate a hint. The hint provider module 1031 may check whether the notification object stored in the notification checking module 1038 is present and may request the notification checking module 1038 to transmit the stored notification object to the notification hint generating module 1037.

According to various embodiments, the parameter that the notification hint generating module 1037 obtains may include a notification ID parameter in which a notification ID of the notification object is defined, an icon parameter in which an icon displayed in the notification bar is defined, a title parameter in which a title displayed in the notification bar is defined, a text parameter in which a text displayed in the notification bar is defined, a pending intent parameter in which a task to be executed if the notification object displayed in the notification bar is selected is defined, or the like.

In operation 1104, the notification hint generating module 1037 may select one or more tasks based on the obtained parameter by using a framework.

According to some embodiments, the notification hint generating module 1037 may transmit the obtained parameter to the hint server 1050 by using a wireless communication circuit and may receive at least one task from the hint server 1050. The notification hint generating module 1037 may select a task, which is associated with the event received in operation 1101, from among the received at least one or more tasks. For example, the text defined in a text parameter of a notification object that the notification hint generating module 1037 obtains may read: "where are we going to meet tomorrow?", and the task defined in the pending intent parameter may be a task that launches a message application if a notification object displayed in a display is selected. According to at least one embodiment of the present disclosure, the notification hint generating module 1037 may transmit a text parameter saying "where are we going to meet tomorrow?" and a pending intent parameter in which the task is defined, to the hint server 1050. The hint server 1050 may transmit, to the notification hint generating module 1037, a task that launches a message application based on the pending intent parameter, in which the task is defined, to transmit a response saying: "let's meet in Gangnam," a task that launches a map application based on a text parameter saying "where are we going to meet tomorrow?" to search for a restaurant, a task that launches an Internet application to search for a recommended place, or the like. The notification hint generating module 1037 may select a task, which launches a map application associated with the received event to search for a restaurant, from among the received tasks.

According to various embodiments, the notification hint generating module 1037 may select a task based on context information (e.g., information about the current state of a user terminal, for example, information of an application program or the like, while the user terminal is being executed) received from the context module 155a.

According to some embodiments, the notification hint generating module 1037 may select one or more tasks from a plurality of tasks stored in the notification database 1039, based on the obtained parameter. For example, the notification database 1039 may store first data including a hint message saying "execute a power save mode", which corresponds to a low battery level notification ID, and a task to execute the power save mode or second data including a hint message saying "delete temporary files", which corresponds to a notification ID for the lack of storage space, and a task to delete a temporary file. In the case where the notification hint generating module 1037 obtains the low battery level notification ID in operation 1103, the notification hint generating module 1037 may select the task to execute a power save mode, which corresponds to the low battery level notification ID, from the first data or the second data stored in the notification database 1039.

According to certain embodiments of the present disclosure, the notification database 1039 may store a plurality of tasks. According to at least one embodiment, the plurality of tasks may include a plurality of sets of tasks each of which includes one or more tasks. According to various embodiments, sets of tasks may correspond to domains, respectively. According to some embodiments, each of the domains may correspond to an application program.

For example, the plurality of tasks may include a first set of tasks including one or more tasks associated with the transmission or reception of a message and a second set of tasks including one or more tasks associated with the search. According to at least one embodiment, the first set of tasks may correspond to a message transmitting/receiving domain, and the second set of tasks may correspond to a search domain. According to various embodiments, the message transmitting/receiving domain may correspond to a message application program, and the search domain may correspond to an Internet application program.

According to certain embodiments, in the case where the received notification event corresponds to the message transmitting/receiving domain, the notification hint generating module 1037 may select one or more tasks from the first set of tasks. According to at least one embodiment, in the case where the received notification event corresponds to the search domain, the notification hint generating module 1037 may select one or more tasks from the second set of tasks.

According to various embodiments, the notification hint generating module 1037 may select one or more tasks further based on an application program corresponding to the received notification event. For example, the received notification event may be a message receiving event that a message application program generates. The notification hint generating module 1037 may select one or more tasks associated with the message transmission and reception corresponding to the message transmitting/receiving domain, based on the message application program corresponding to the message receiving event.

In operation 1105, the intelligence agent 1010 may select a request for a natural language expression indicating at least one task among the selected one or more tasks.

According to some embodiments, the intelligence agent 1010 may receive the one or more tasks selected from the notification hint generating module 1037, and the intelligence agent 1010 may make the request for the natural language expression indicating at least one task among the one or more tasks received by using a wireless communication circuit, to the intelligence server 1060. The natural language expression may be a form in which a hint to be provided to a user is expressed, and the task may be a task to be executed by a user terminal when the hint is selected. When making a request for the natural language expression, the intelligence agent 1010 may transmit the one or more parameters obtained in operation 1103 to the intelligence server 1060 and may receive the natural language expression as a response to the transmission of the one or more parameters, from the intelligence server 1060. For example, the intelligence agent 1010 may transmit, to the intelligence server 1060, a pending intent parameter in which a task that launches a map application to search for a restaurant is defined, or a pending intent parameter in which a task that launches an Internet application to search for a recommended place is defined; and the intelligence agent 1010 may request a natural language expression indicating the task. The intelligence agent 1010 may transmit the natural language expression received from the intelligence server 1060, to the notification hint generating module 1037. The notification hint generating module 1037 may select the received natural language expression saying "search for a restaurant by using a map application" and the received natural language expression saying "search for the recommended place". However, in various embodiments, the processor 150 of a user terminal may generate the natural language expression.

In operation 1106, the processor 150 may provide a user interface including the selected natural language expression to a touchscreen display. For example, the processor 150 may display the natural language expression saying "search for a restaurant by using a map application" or the natural language expression saying "search for the recommended place", in a display.

In operation 1107, the processor 150 may execute at least one task based on a user input of a natural language expression provided on the touchscreen display. For example, the processor 150 may receive a user input of one among the natural language expression saying "search for a restaurant by using a map application" and the natural language expression saying "search for the recommended place", which are provided on the touchscreen display. In the case where the processor 150 receives a user input of the natural language expression saying "search for a restaurant by using a map application", the processor 150 may execute a task that launches a map application to searches for a restaurant.

Hereinafter, an illustrative example of a user terminal generating a hint from a notification according to some embodiments of this disclosure will be described with reference to drawings.

FIGS. 12A to 12D illustrate a screen in which a hint is provided based on a notification associated with security of a user terminal and a task according to hint selection is executed, according to some embodiments of the present disclosure.

Figure 12A:
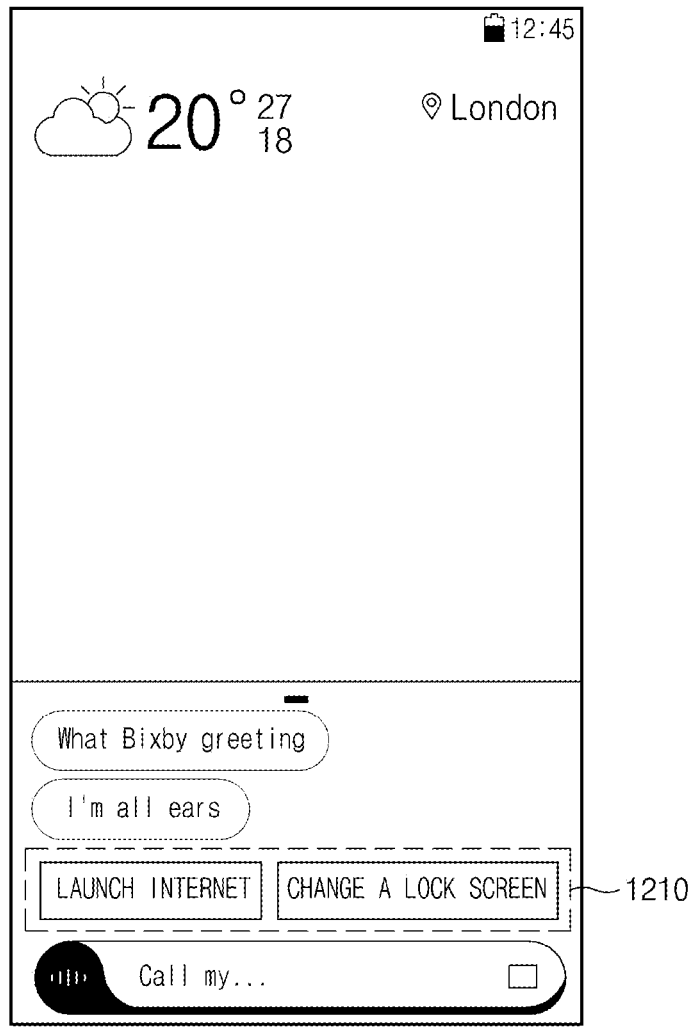
FIGS. 12A to 12D illustrate screens in which a hint is provided based on a notification associated with security of a user terminal and a task according to hint selection is executed, according to some embodiments of the present disclosure.

According to certain embodiments of the present disclosure, such as illustrated in FIG. 12A, the hint provider module 1031 of a user terminal may display a hint 1210 generated by using a context hint generating module, a reuse hint generating module or an introduction hint generating module, in a display.

According to certain embodiments, as illustrated in FIG. 12A, the UI of an intelligence app may be displayed in a part of the display, and the hint provider module 1031 of the user terminal may display the hint 1210 in the UI of the intelligence app.

Figure 12B:
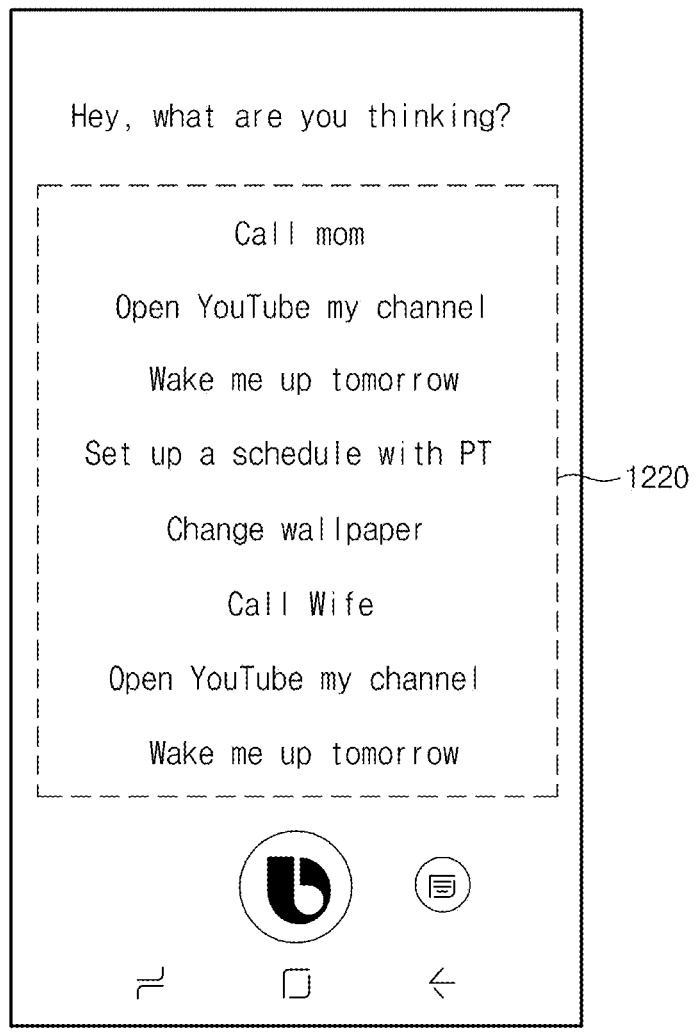

According to various embodiments of the present disclosure, as illustrated in FIG. 12B, the UI of the intelligence app may be displayed in the whole of the display, and the hint provider module 1031 of the user terminal may display a hint 1220 in the UI of the intelligence app.

Figure 12C:
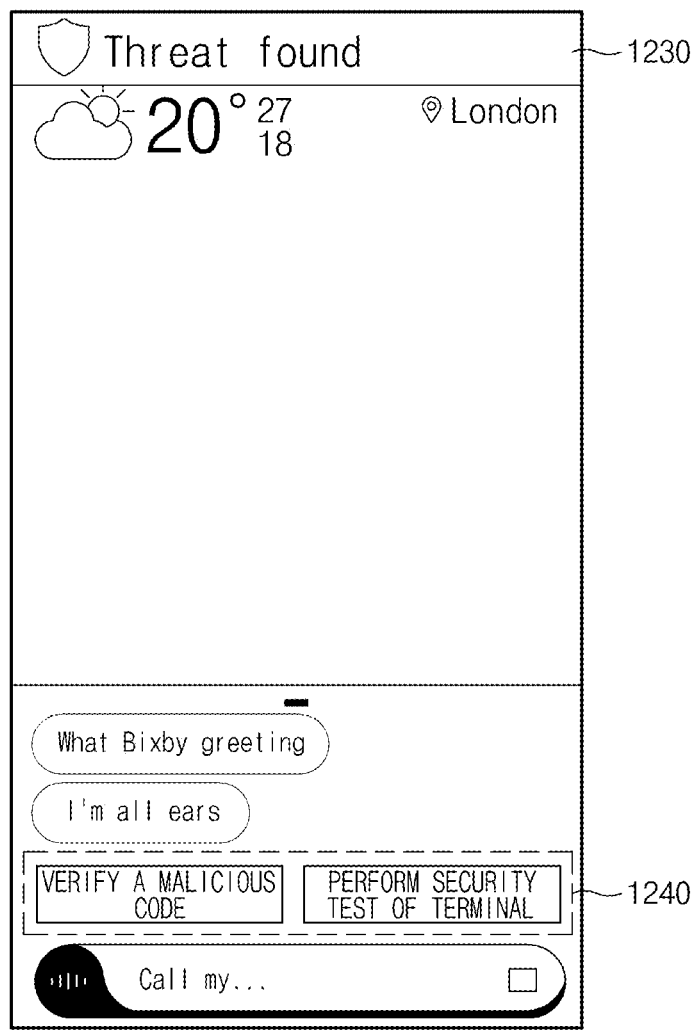

As illustrated in FIG. 12C, the notification managing module 1040 may display notification context of a notification object associated with the received notification event, in a notification bar. The notification checking module 1038 may transmit the notification object received from the notification managing module 1040, to the notification hint generating module 1037.

According to some embodiments of the present disclosure, the notification hint generating module 1037 may parse the notification object to obtain a parameter in which a text saying "security threat of a user terminal occurred" is defined and a pending intent parameter in which a task to launch a security-related application when notification context is selected is defined.

According to at least one embodiment of the present disclosure, the notification hint generating module 1037 may select a task to verify a malicious code based on the obtained parameter and a task to perform the security check of the user terminal. For example, if the notification context displayed in a notification bar is selected, the security-related application may be launched. The notification hint generating module 1037 may select the task to verify a malicious code and the task to perform the security check of the user terminal among a plurality of tasks stored in a memory, based on the pending intent parameter in which a task to launch the security-related application is defined.

According to some embodiments of the present disclosure, the intelligence agent 1010 may transmit the obtained parameter to the intelligence server 1060 and may receive a natural language expression indicating a task to transmit the natural language expression to the notification hint generating module 1037. The notification hint generating module 1037 may select the received natural language expression. As illustrated in FIG. 12C, the processor 150 may display a user interface 1240 including a natural language expression saying "verify a malicious code" and a natural language expression saying "perform the security check of a terminal", in a display.

Figure 12D:

According to certain embodiments of the present disclosure, the processor 150 may receive a user input of a user interface including the natural language expression saying "perform the security check of the terminal". As illustrated in FIG. 12D, the processor 150 may perform the security check of the user terminal based on the received user input to display a result 1250 obtained by performing the security check.

Figure 13A:
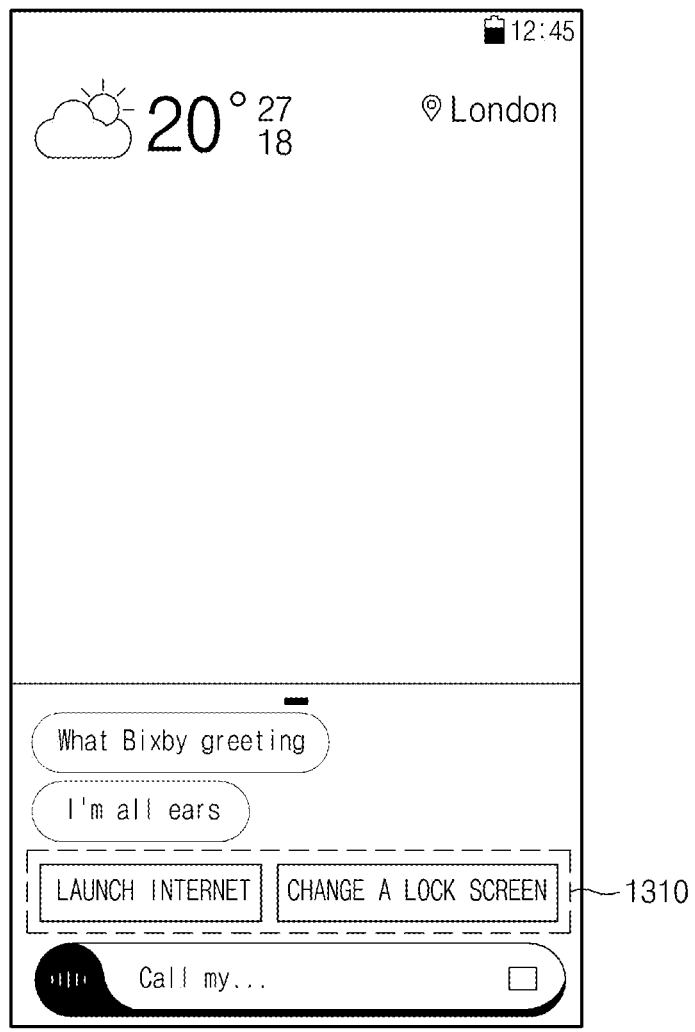
FIGS. 13A to 13C illustrate screens in which a hint is provided depending on a notification associated with power of a user terminal and a task according to hint selection is executed, according to some embodiments of the present disclosure.
Figure 13B:
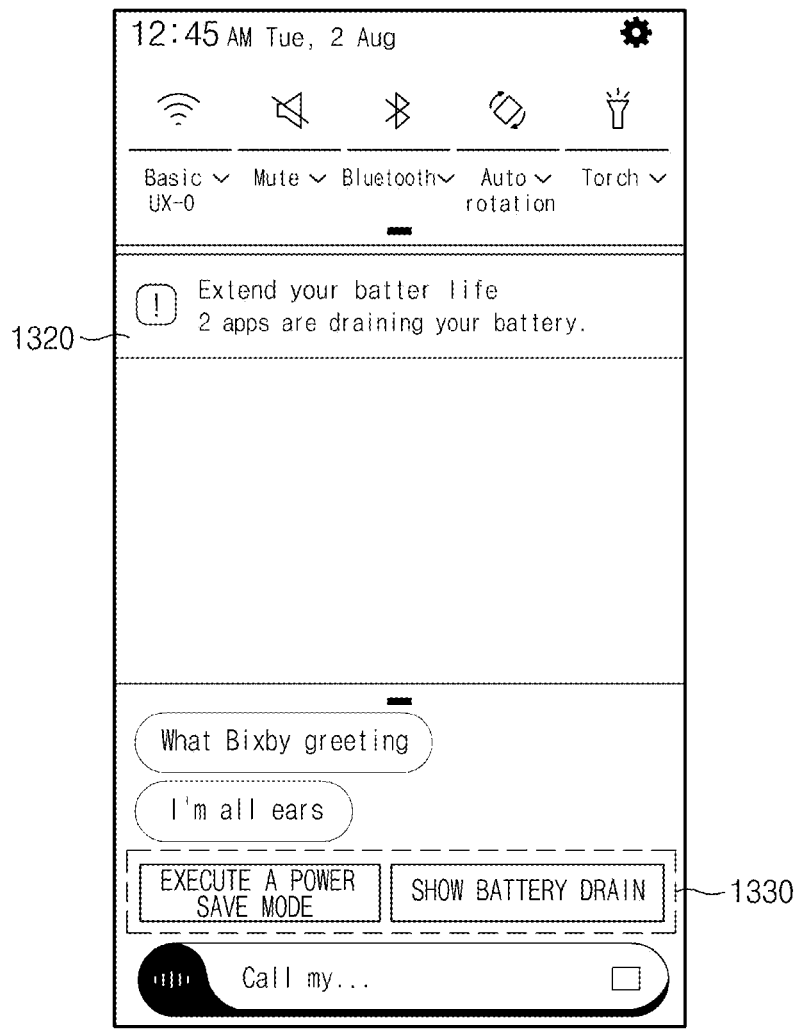
Figure 13C:
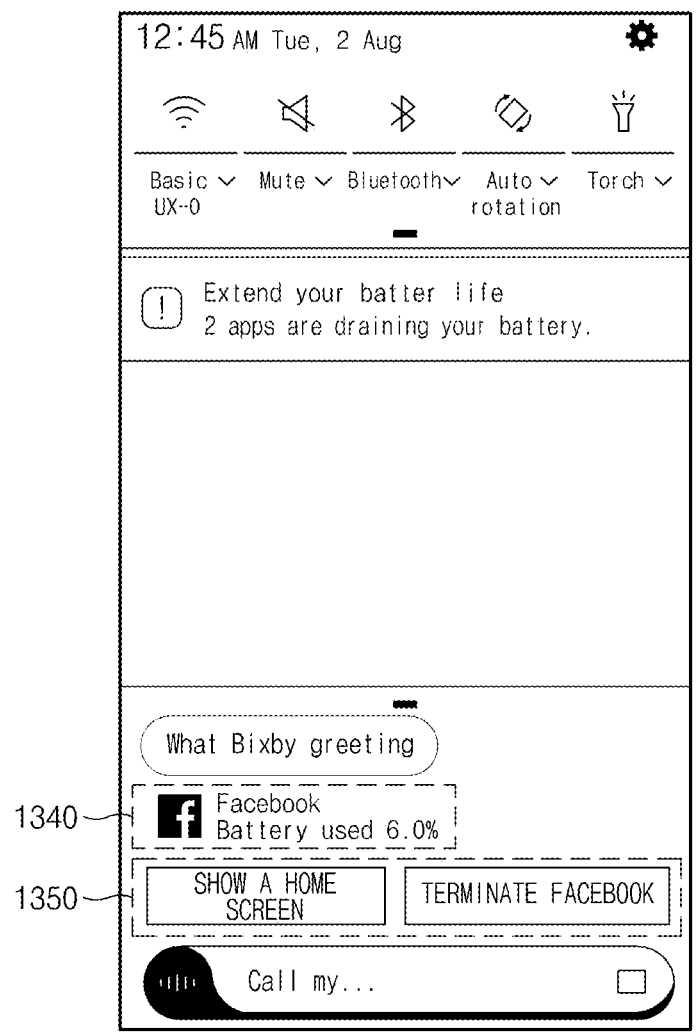

FIGS. 13A to 13C illustrate a screen in which a hint is provided depending on a notification associated with power of a user terminal and a task according to hint selection is executed, according to certain embodiments of the present disclosure.

According to some embodiments of the present disclosure, such as illustrated in FIG. 13A, the hint provider module 1031 may display a hint 1310 generated by using a context hint generating module, a reuse hint generating module or an introduction hint generating module, in a display.

As illustrated in the non-limiting example of FIG. 13B, the notification managing module 1040 may display notification context 1320 of a notification object associated with the received notification event, in a notification bar. The notification checking module 1038 may receive a notification object from the notification managing module 1040 to transmit the notification object to the notification hint generating module 1037.

According to various embodiments of the present disclosure, the notification hint generating module 1037 may parse the notification object to obtain a parameter in which context saying "two applications being executed by a user terminal are draining a battery" is defined and a pending intent parameter in which a task to launch a battery-related application when the notification context is selected is defined.

According to some embodiments of the present disclosure, the notification hint generating module 1037 may select a task to execute a power save mode based on the obtained parameter and a task to display an application draining a battery. For example, if notification context displayed in a notification bar is selected, the battery-related application may be launched. The notification hint generating module 1037 may select the task to execute a power save mode and the task to display an application draining a battery and a battery usage amount, among a plurality of tasks stored in a memory based on a pending intent parameter in which a task to launch the battery-related application is defined.

According to some embodiments of the present disclosure, the intelligence agent 1010 may transmit the obtained parameter to the intelligence server 1060 and may receive a natural language expression indicating a task to transmit the natural language expression to the notification hint generating module 1037. The notification hint generating module 1037 may select the received natural language expression. As illustrated in FIG. 13B, the processor 150 may display a user interface 1330 including a natural language expression saying "execute a power save mode" or a natural language expression saying "show battery drain", in a display.

According to at least one embodiment of the present disclosure, the processor 150 may receive a user input of a user interface including the natural language expression saying "show battery drain". The processor 150 may execute the task to display the application draining the battery of a user terminal and the battery usage amount, based on the received user input. At this time, the processor 150 may not launch a separate application but receive information from an application, as illustrated in FIG. 13C, to display an application draining the battery of the user terminal and a battery usage amount 1340.

According to certain embodiments, the processor 150 may generate a hint based on the execution result of the task, as illustrated in FIG. 13C, and may execute a task to display a natural language expression saying "show a home screen" and a natural language expression 1350 saying "terminate Facebook".

Figure 14A:
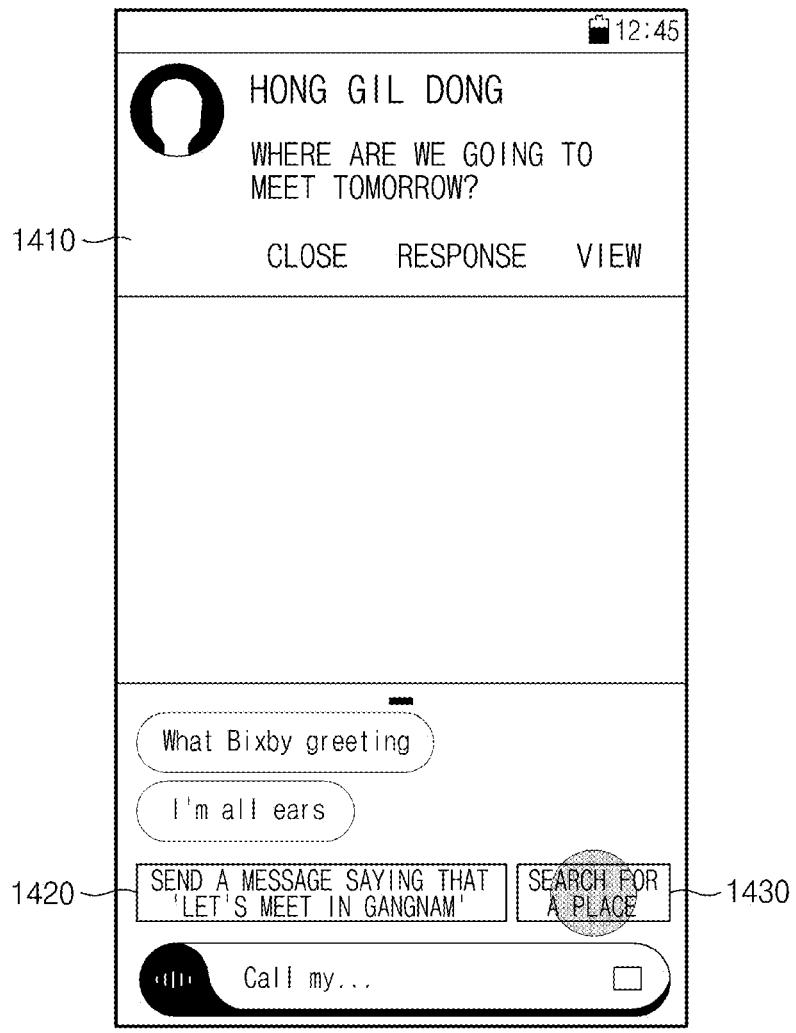
FIGS. 14A to 14C illustrate screens in which a hint is provided based on a received text message notification and a task according to hint selection is executed, according to certain embodiments of the present disclosure.
Figure 14B:
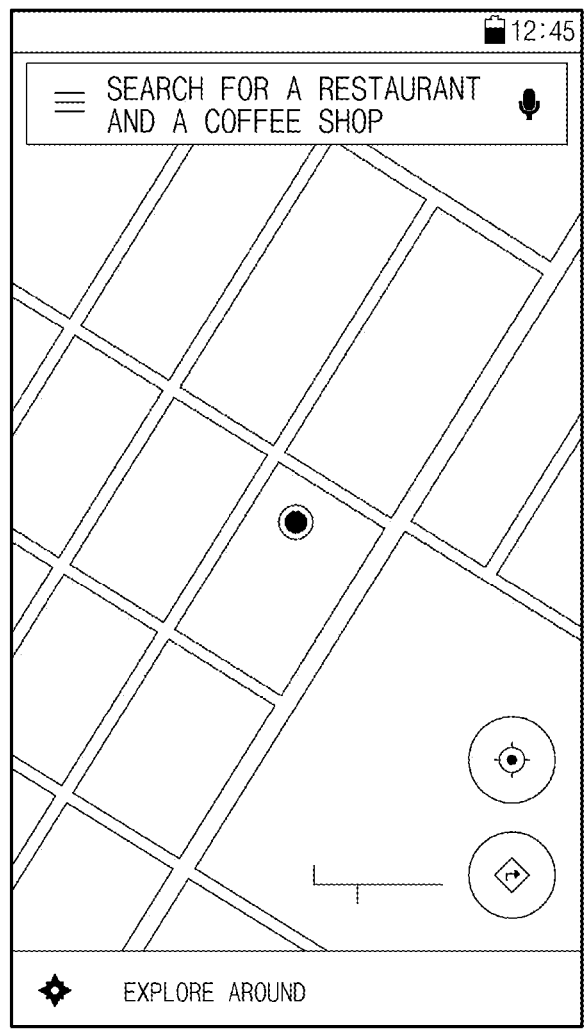
Figure 14C:

FIGS. 14A to 14C illustrate a screen in which a hint is provided based on a received text message notification and a task according to hint selection is executed, according to an embodiment of the present disclosure.

According to some embodiments of the present disclosure, the notification managing module 1040 may receive the message receiving event received from the outside of a user terminal, from the application 1020. As illustrated in FIG. 14A, the notification managing module 1040 may display notification context 1410 of a notification object associated with the received notification event, in a notification bar. The notification checking module 1038 may receive a notification object from the notification managing module 1040 to transmit the notification object to the notification hint generating module 1037.

According to various embodiments of the present disclosure, the notification hint generating module 1037 may parse a notification object to obtain a text parameter in which a text saying "where are we going to meet tomorrow?" is defined as a text displayed in a notification bar, and a pending intent parameter in which a task to launch a message application when notification context is selected, and a task to generate an area for receiving a text when a "response" is selected from the notification object are defined.

According to certain embodiments of the present disclosure, the notification hint generating module 1037 may transmit, to the hint server 1050, a text parameter in which a text saying "where are we going to meet tomorrow?" is defined, and a pending intent parameter in which a task to launch a message application when notification context is selected, and a task to generate an area for receiving a text when "response" is selected from the notification object are defined.

The hint server 1050 may transmit, to the notification hint generating module 1037, a task that launches a message application based on the received parameter to transmit a response, a task that launches a map application to search for a restaurant and a coffee shop, and a task that launches an Internet application to search for a recommended place.

According to certain embodiments of the present disclosure, the notification hint generating module 1037 may select a task to transmit a response saying "let's meet in Gangnam", a task that launches a map application to search for a restaurant and a coffee shop, and a task that launches an Internet application to search for a recommended place, among the received a plurality of tasks.

According to some embodiments of the present disclosure, the intelligence agent 1010 may transmit the obtained parameter to the intelligence server 1060 and may receive a natural language expression indicating a task to transmit the natural language expression to the notification hint generating module 1037. The notification hint generating module 1037 may select the received natural language expression. As illustrated in FIG. 14A, the processor 150 may display a user interface including a natural language expression 1420 saying "send a message saying 'let's meet in Gangnam'" and a natural language expression 1430 saying "search for a place," in a display.

According to various embodiments of the present disclosure, the processor 150 may receive a user input of a user interface including the natural language expression saying "search for a place". As illustrated in FIG. 14B, the processor 150 may execute the task that launches a map application based on the received user input to search for the restaurant and the coffee shop, and as illustrated in FIG. 14C, the processor 150 may execute the task that launches an Internet application to search for a recommended place.

Figure 15A:
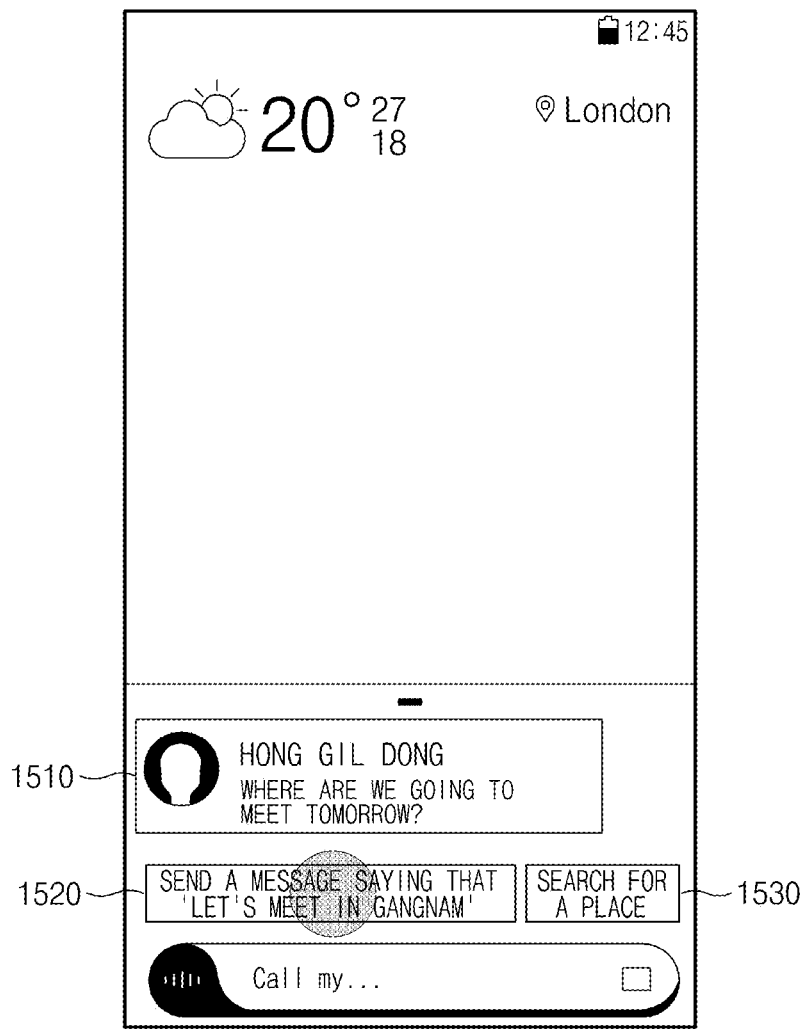
FIGS. 15A to 15B illustrate screens in which a hint is provided based on a received text message notification and a task according to hint selection is executed, according to at least one embodiment of the present disclosure.
Figure 15B:
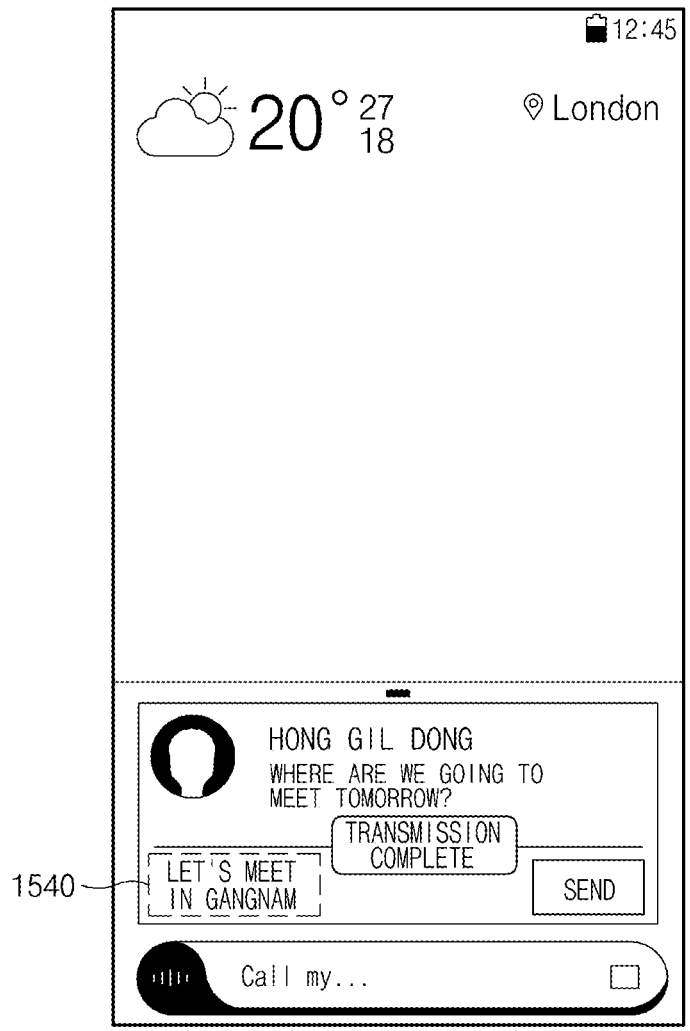

FIGS. 15A to 15B illustrate a screen in which a hint is provided based on a received text message notification and a task according to hint selection is executed, according to an embodiment of the present disclosure.

As illustrated in the non-limiting example of FIG. 15A, the notification managing module 1040 may display notification context 1510 of a notification object associated with the received notification event, in an area, in which an intelligence service is provided, of a display. The notification checking module 1038 may receive a notification object from the notification managing module 1040 to transmit the notification object to the notification hint generating module 1037.

According to various embodiments of the present disclosure, the notification hint generating module 1037 may parse a notification object to obtain a text parameter in which a text saying "where are we going to meet tomorrow" is defined as a text displayed in a notification bar, and a pending intent parameter in which a task to launch a message application when notification context is selected, and a task to generate an area for receiving a text when "response" is selected from the notification object are defined.

According to various embodiments of the present disclosure, such as described with reference to FIGS. 14A to 14C, the notification hint generating module 1037 may select a task to transmit a response saying "let's meet in Gangnam", a task that launches a map application to search for a restaurant and a coffee shop, and a task that launches an Internet application to search for a recommended place, among the received a plurality of tasks.

According to various embodiments of the present disclosure, the intelligence agent 1010 may transmit the obtained parameter to the intelligence server 1060 and may receive a natural language expression indicating a task to transmit the natural language expression to the notification hint generating module 1037. The notification hint generating module 1037 may select the received natural language expression. As illustrated in FIG. 15A, the processor 150 may display a user interface including a natural language expression 1520 saying "send a message saying 'let's meet in Gangnam'" and a natural language expression 1530 saying "recommend a place", in a display.

According to various embodiments of the present disclosure, the processor 150 may receive a user input of a user interface including the natural language expression saying "send a message saying 'let's meet in Gangnam'". As illustrated in FIG. 15B, the processor 150 may execute a task to transmit a response saying "let's meet in Gangnam", based on the received user input. At this time, the processor 150 may not execute a message application but display a screen in which a response is transmitted to an area, in which an intelligence service is provided, of a display.

Figure 16A:
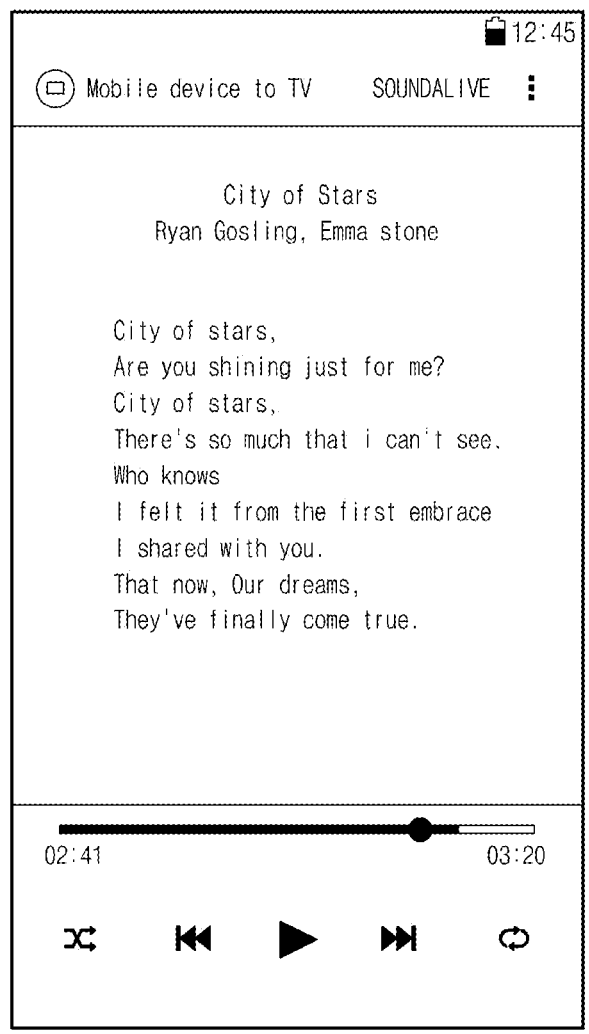
FIGS. 16A to 16C illustrate screens in which a hint is provided based on a type of a notification generated during music playback, according to some embodiments of the present disclosure.
Figure 16B:
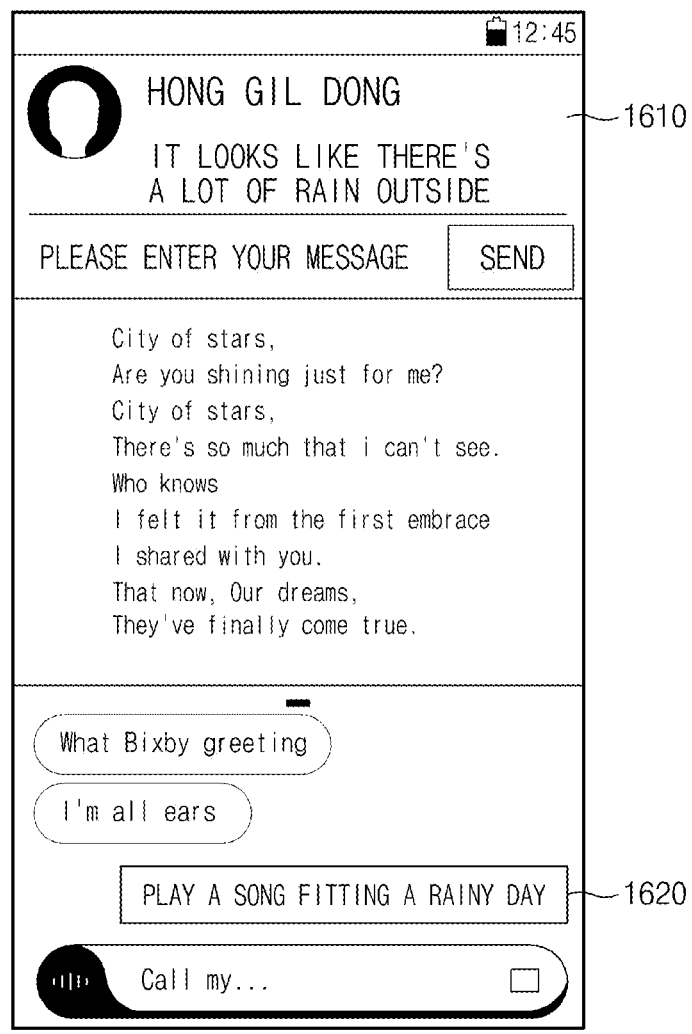
Figure 16C:

FIGS. 16A to 16C illustrate a screen in which a hint is provided based on a type of a notification generated during music playback, according to an embodiment of the present disclosure.

While a music playback application is executed as illustrated in FIG. 16A, as illustrated in the non-limiting example of FIG. 16B, the notification managing module 1040 may display notification context 1610 of a notification object associated with the received notification event, in a notification bar. The notification checking module 1038 may receive a notification object from the notification managing module 1040 to transmit the notification object to the notification hint generating module 1037.

According to various embodiments of the present disclosure, the notification hint generating module 1037 may parse a notification object to obtain a text parameter in which a text saying "it looks like there's a lot of rain outside" is defined as a text displayed in a notification bar.

According to some embodiments of the present disclosure, the notification hint generating module 1037 may transmit, to the hint server 1050, a text parameter in which a text saying "it looks like there's a lot of rain outside" is defined.

According to at least one embodiment of the present disclosure, the hint server 1050 may transmit, to the notification hint generating module 1037, a task that launches a weather application based on a text saying "it looks like there's a lot of rain outside" to display weather information and a task that searches for a song fitting a rainy day in a music playback application to play the song.

According to certain embodiments of the present disclosure, the notification hint generating module 1037 may select the task, which searches for a song fitting a rainy day in a music playback application to play the song, among the received a plurality of tasks based on information about the fact that an application being executed in a user terminal is a music playback application, that is, context information.

According to some embodiments of the present disclosure, the intelligence agent 1010 may transmit the obtained parameter to the intelligence server 1060 and may receive a natural language expression indicating a task to transmit the natural language expression to the notification hint generating module 1037. The notification hint generating module 1037 may select the received natural language expression. As illustrated in FIG. 16B, the processor 150 may display a user interface 1620 including a natural language expression saying "play a song fitting a rainy day", in a display.

According to certain embodiments of the present disclosure, the processor 150 may receive a user input of a user interface including the natural language expression saying "play a song fitting a rainy day". The processor 150 may execute the task that searches for a song fitting a rainy day in a music playback application to play the song.

While the music playback application is being executed, as illustrated in FIG. 16C, the notification managing module 1040 may display notification context 1630 of a notification object associated with the received notification event, in a notification bar. The notification checking module 1038 may receive a notification object from the notification managing module 1040 to transmit the notification object to the notification hint generating module 1037.

According to some embodiments of the present disclosure, the notification hint generating module 1037 may parse the notification object to obtain a parameter in which a text saying "the battery level of a user terminal is low" is defined.

According to at least one embodiment of the present disclosure, the notification hint generating module 1037 may select a task to execute a power save mode and a task to decrease volume and to terminate the lyric display of a music playback application, among a plurality of tasks stored in a memory based on the obtained parameter or information about the fact that an application being executed in a user terminal is a music playback application.

According to some embodiments of the present disclosure, the intelligence agent 1010 may transmit the obtained parameter to the intelligence server 1060 and may receive a natural language expression indicating a task to transmit the natural language expression to the notification hint generating module 1037. The notification hint generating module 1037 may select the received natural language expression. As illustrated in FIG. 16C, the processor 150 may display a user interface 1640 including a natural language expression saying "execute a power save mode" and a natural language expression saying "decrease volume and close lyrics", in a display.

According to at least one embodiment of the present disclosure, the processor 150 may receive one user input of the user interface including the natural language expression saying "execute a power save mode" and a user interface of the natural language expression saying "decrease volume and close lyrics". The processor 150 may execute a task corresponding to the user input.

Figure 17A:
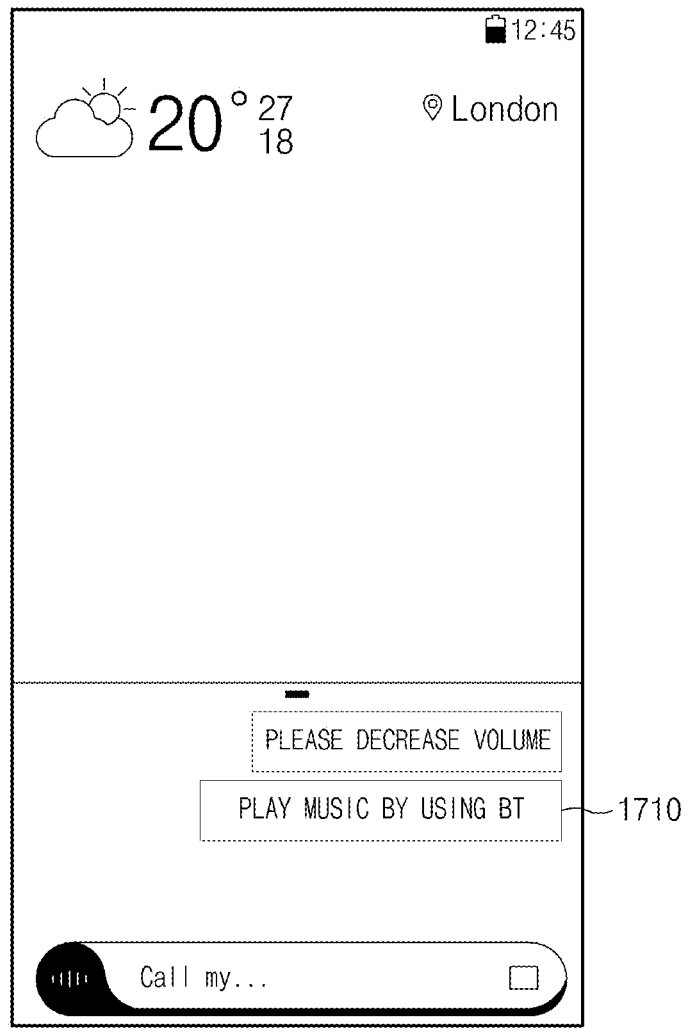
FIGS. 17A to 17B illustrate screens in which a hint is provided based on a user input received through a dialog manager and a received text message notification, according to some embodiments of the present disclosure.
Figure 17B:
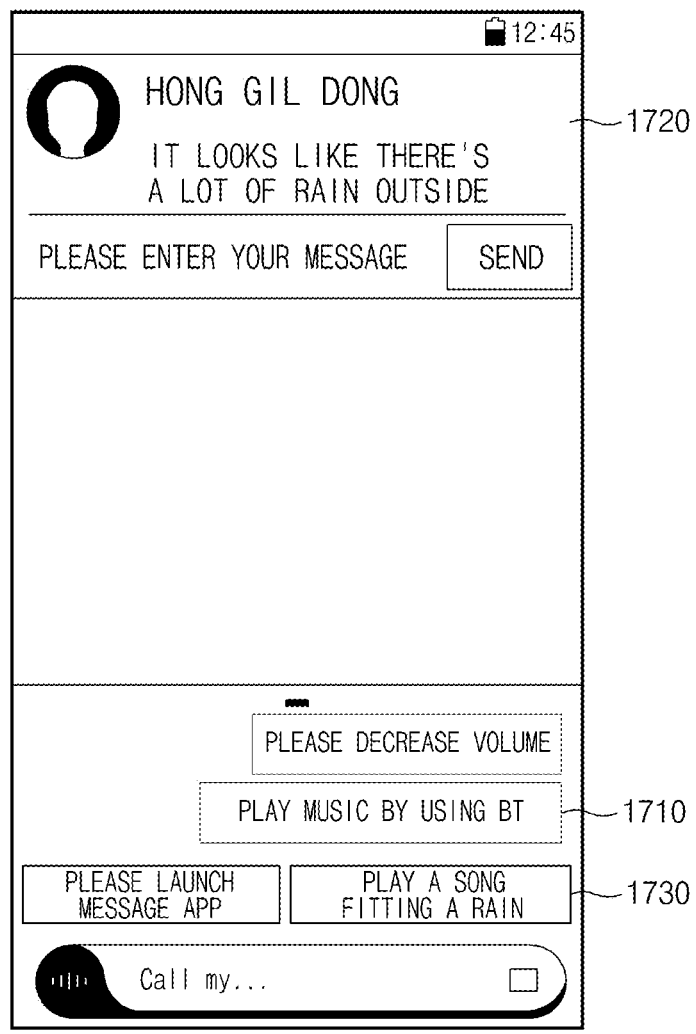

FIGS. 17A to 17B illustrate a screen in which a hint is provided based on a user input received through a dialog manager and a received text message notification, according to an embodiment of the present disclosure.

As illustrated in the non-limiting example of FIG. 17A, input context 1710 of a user received through a dialog manager may be displayed in an area, in which an intelligence service is provided, of a display. The notification managing module 1040 may display notification context 1720 of a notification object associated with the received notification event, in a notification bar. The notification checking module 1038 may receive a notification object from the notification managing module 1040 to transmit the notification object to the notification hint generating module 1037.

According to certain embodiments of the present disclosure, the notification hint generating module 1037 may parse a notification object to obtain a text parameter in which a text saying "it looks like there's a lot of rain outside" is defined as a text displayed in a notification bar, and a pending intent parameter in which a task to launch a message application when notification context is selected, and a task to generate an area for receiving a text when "response" is selected from the notification object are defined.

According to various embodiments of the present disclosure, the notification hint generating module 1037 may transmit the obtained parameter to the hint server 1050. At this time, the intelligence agent 1010 may transmit a text saying "play music by using BT" being a user input received through the dialog manager to the hint server 1050.

According to at least one embodiment of the present disclosure, the hint server 1050 may transmit, to the notification hint generating module 1037, a task to launch a message application and a task that searches for a song fitting a rainy day in a music playback application to play the song, based on a text saying "it looks like there's a lot of rain outside" and a text saying "play music by using BT" from the received parameter, respectively.

According to certain embodiments of the present disclosure, the notification hint generating module 1037 may select the task to launch a message application and the task that searches for a song fitting a rainy day in a music playback application to play the song, among the received a plurality of tasks.

According to some embodiments of the present disclosure, the intelligence agent 1010 may transmit the obtained parameter to the intelligence server 1060 and may receive a natural language expression indicating a task to transmit the natural language expression to the notification hint generating module 1037. The notification hint generating module 1037 may select the received natural language expression. As illustrated in the non-limiting example of FIG. 17B, the processor 150 may display a user interface 1730 including a natural language expression saying "launch a message application" and a natural language expression saying "play a song fitting a rainy day", as a hint in the display.

Figure 18A:
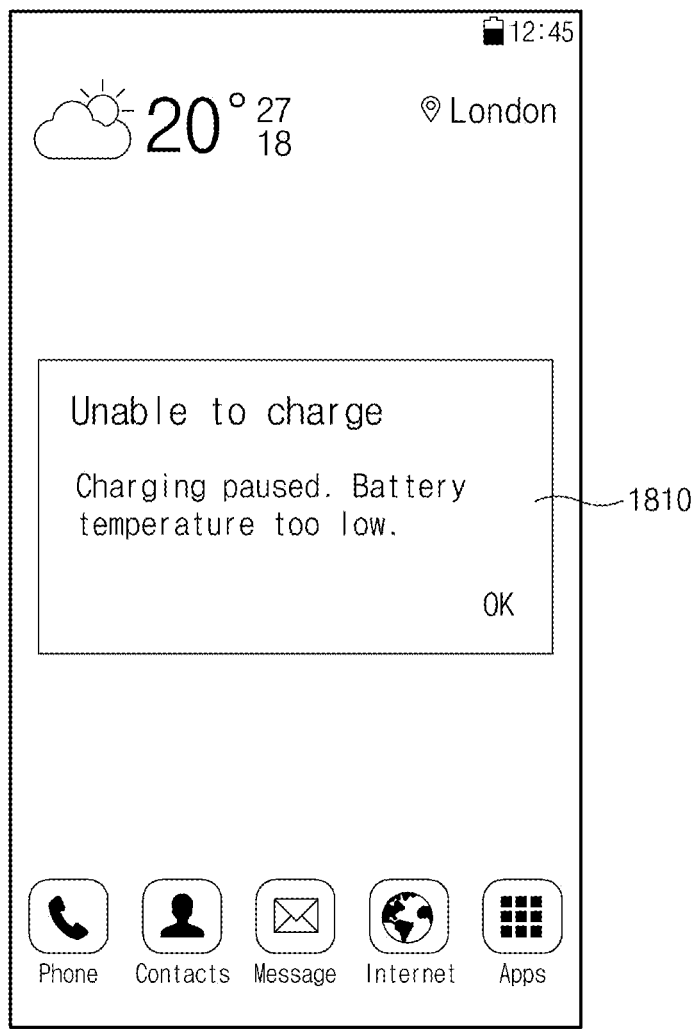
FIGS. 18A to 18C illustrate screens in which a hint is provided based on a system notification and a task according to hint selection is executed, according to some embodiments of the present disclosure.
Figure 18B:
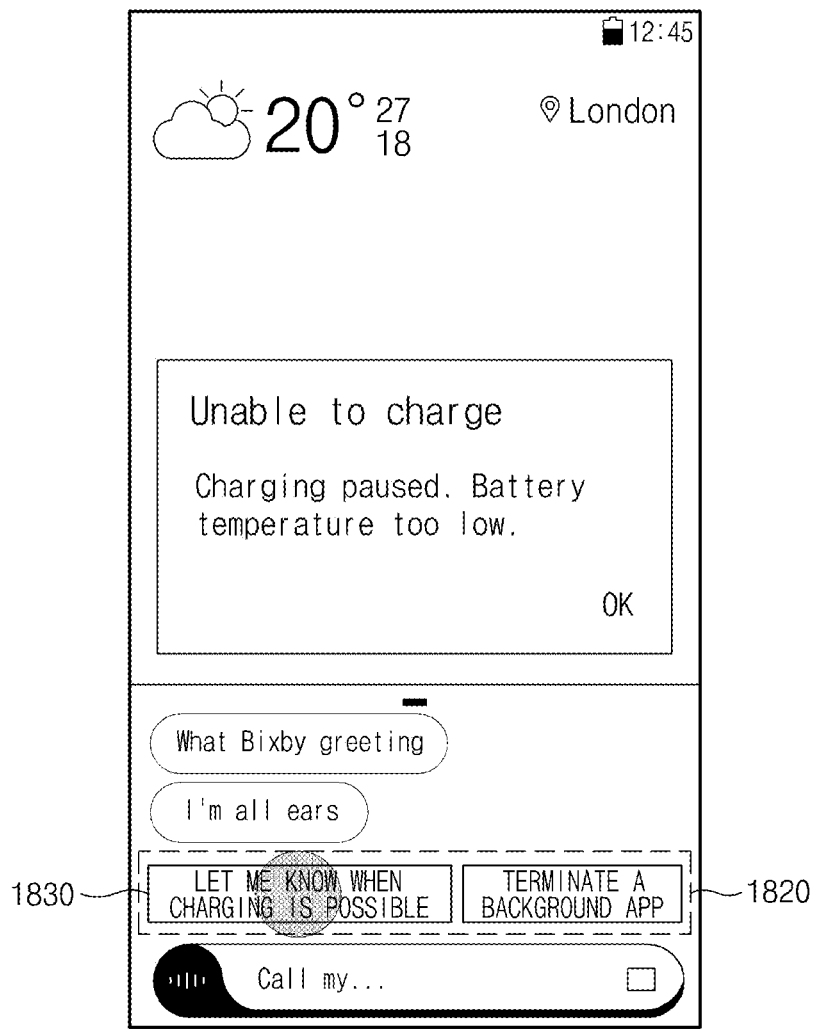
Figure 18C:
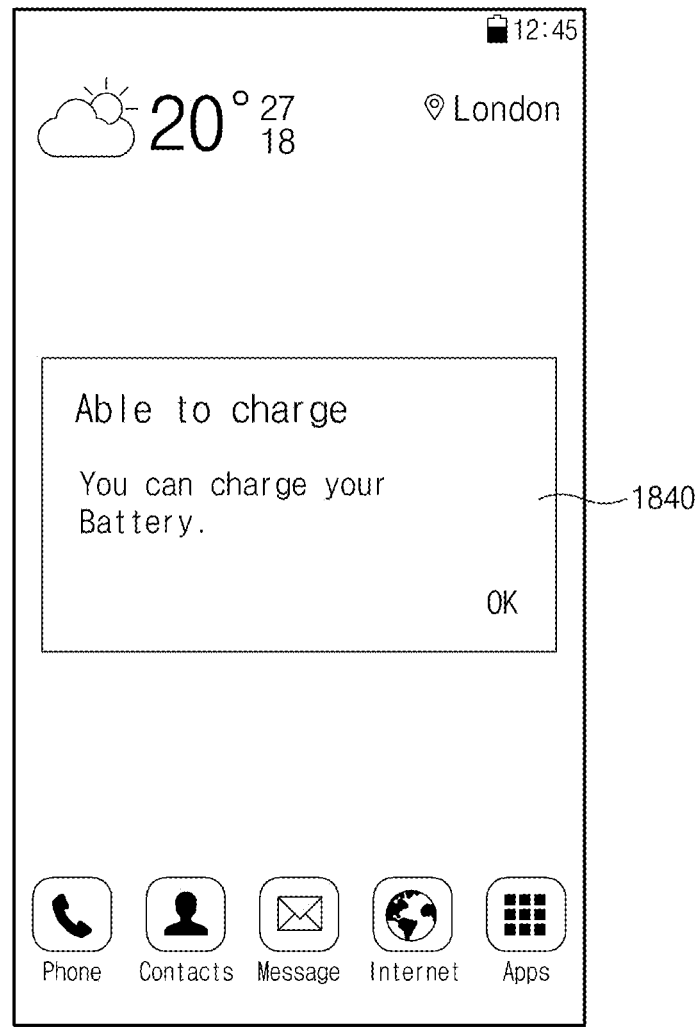

FIGS. 18A to 18C illustrate a screen in which a hint is provided based on a system notification and a task according to hint selection is executed, according to some embodiments of the present disclosure.

As illustrated in the non-limiting example of FIG. 18A, the notification managing module 1040 may display notification context 1810 of the system notification object of a user terminal, in a notification bar, instead of an application notification object. The notification checking module 1038 may receive a notification object from the notification managing module 1040 to transmit the notification object to the notification hint generating module 1037.

According to various embodiments of the present disclosure, the notification hint generating module 1037 may parse a notification object to obtain a parameter in which context saying "it is impossible to charge due to a low temperature of a battery" is defined. According to certain embodiments, the notification hint generating module 1037 may obtain a notification ID parameter.

According to at least one embodiment of the present disclosure, the notification hint generating module 1037 may select a task to display a notification at a point in time when charging is possible and a task to terminate a background application, among a plurality of tasks stored in a memory based on the obtained parameter. In other words, the notification hint generating module 1037 may select a task, which corresponds to the notification ID parameter of a battery-not-charging notification, among tasks stored in the notification database 1039. In another embodiment, the notification hint generating module 1037 may transmit the obtained parameter to the hint server 1050 and may select at least one task among the tasks received from the hint server 1050.

According to various embodiments of the present disclosure, the intelligence agent 1010 may transmit the obtained parameter to the intelligence server 1060 and may receive a natural language expression indicating a task to transmit the natural language expression to the notification hint generating module 1037. As illustrated in FIG. 18B, the processor 150 may display a natural language expression saying "let me know when charging is possible" and a natural language expression saying "terminate a background application" as a hint 1820 in a display.

According to at least one embodiment of the present disclosure, the processor 150 may receive a user input of a user interface 1830 including the natural language expression saying "let me know when charging is possible", and, as illustrated in 18C, may execute a task to display a notification 1840 at a point in time when charging is possible.

According to various embodiments, the notification hint generating module 1037 may generate a hint based on a type of the application 1020 generating a notification event. According to an embodiment, the hint according to a notification generated by a call-related application may be set to "refuse" and "accept". According to an embodiment, the hint according to a notification generated by a game-related application may be set to "launch a game". According to at least one embodiment, the hint according to a notification generated by a music-related application may be set to "play the song". According to some embodiments, the hint according to a notification generated by a message-related application may be set to "reply" or "make a call". In the case where the notification hint generating module 1037 receives a notification object generated by a telephone-related application, the notification hint generating module 1037 may generate a hint saying "refuse".

According to certain embodiments, even though a task executed when a notification object is selected is not defined in a parameter of a notification object, the notification hint generating module 1037 may provide a subsequent task, which executed after the notification object is displayed, as a hint. According to various embodiments, the subsequent task may be determined based on the use history of a user or the predefined task.

According to some embodiments, where the notification hint generating module 1037 receives a plurality of notification objects, the notification hint generating module 1037 may generate a hint based on the most recently received notification object.

According to at least one embodiment, where the notification hint generating module 1037 receives a plurality of notification objects, the notification hint generating module 1037 may generate a hint based on the notification object generated by the application 1020 that is heavily utilized by users.

According to various embodiments, where the priorities among a plurality of applications 1020 is set in advance and the notification hint generating module 1037 receives a plurality of notification objects, the notification hint generating module 1037 may select a notification object based on the preset priority and may generate a hint based on the selected notification object.

Hereinafter, a process in which a processor executes a task depending on hint selection will be described with reference to the non-limiting example of FIG. 19.

Figure 19:
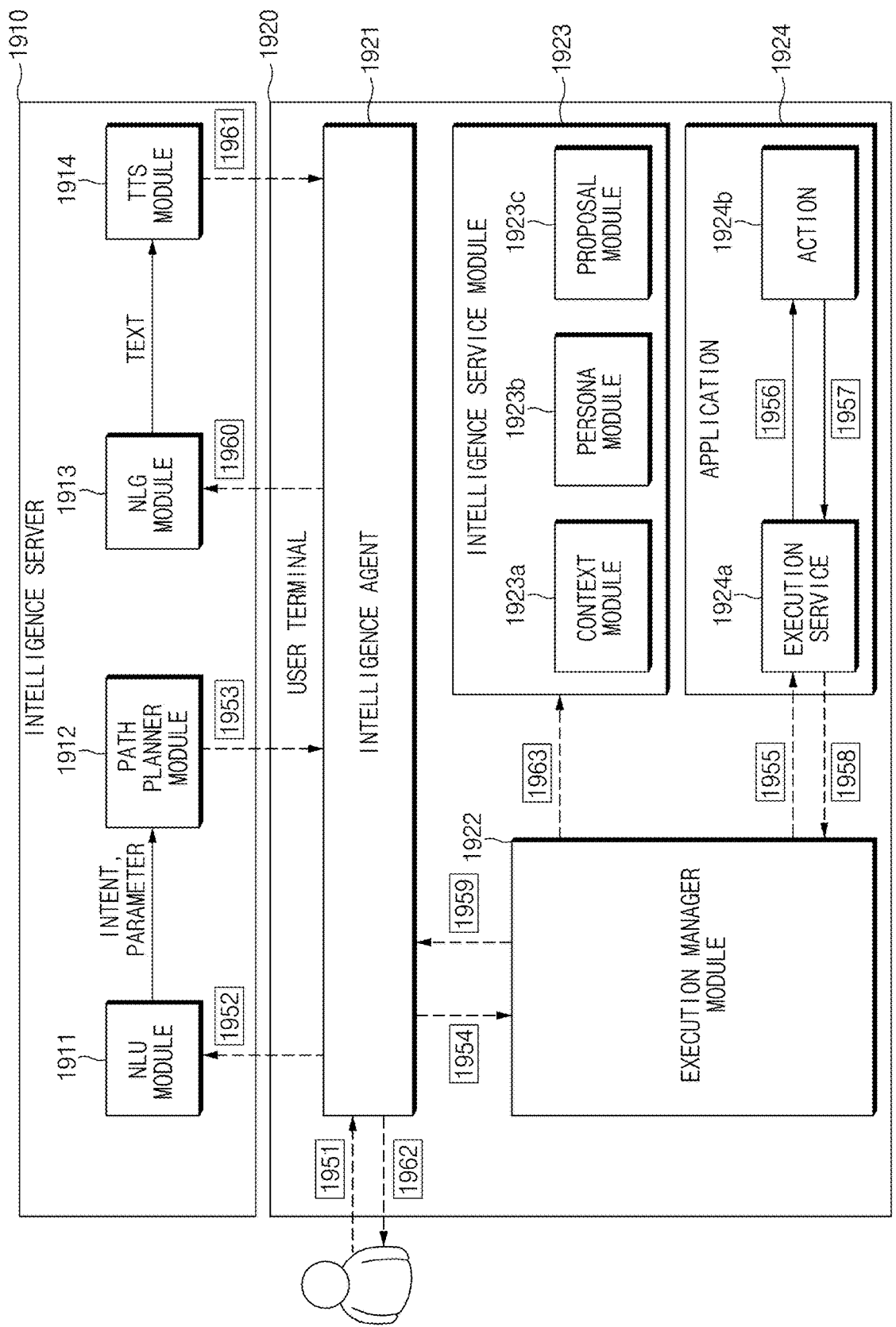
FIG. 19 illustrates a process in which a task is executed depending on hint selection, according to certain embodiments of the present disclosure.

FIG. 19 illustrates a process in which a task is executed depending on hint selection, according to various embodiments of the present disclosure.

If an intelligence agent 1921 of a user terminal 1920 receives user selection associated with a hint (e.g., a user interface including a natural language expression) in operation 1951, the intelligence agent 1921 may transmit a text indicating the hint to an NLU module 1911 of an intelligence server 1910 in operation 1952.

The NLU module 1911 may analyze the received hint to generate user intent and a parameter and may transmit the user intent and the parameter to a path planner module 1912. In operation 1953, the path planner module 1912 may generate a path rule based on the user intent and the parameter to transmit the path rule to the intelligence agent 1921.

In operation 1954, the intelligence agent 1921 may transmit the received path rule to an execution manager module 1922. In operation 1955, the execution manager module 1922 receiving the path rule may make a request for action execution to an execution service 1924*a* of each application 1924. The execution service 1924*a* may execute an action 1924*b* in operation 1956, may receive the execution result in operation 1957, and may transmit the execution result to the execution manager module 1922 in operation 1958.

In operation 1959, the execution manager module 1922 receiving the execution result may transmit an execution complete message to the intelligence agent 1921.

According to some embodiments, after receiving the path rule, in operation 1960, the intelligence agent 1921 may transmit the path rule to an NLG module 1913. The NLG module 1913 may convert the path rule into a text of a natural language format to transmit the converted path rule to a TTS module 1914. In operation 1961, the TTS module 1914 may convert the text into a voice signal to transmit the voice signal to the intelligence agent 1921. In operation 1962, the intelligence agent 1921 may provide the received voice signal to a user.

According to at least one embodiment, after executing the path rule, in operation 1963, the execution manager module 1922 may transmit an execution complete log to an intelligence service module 1923.

Figure 20:
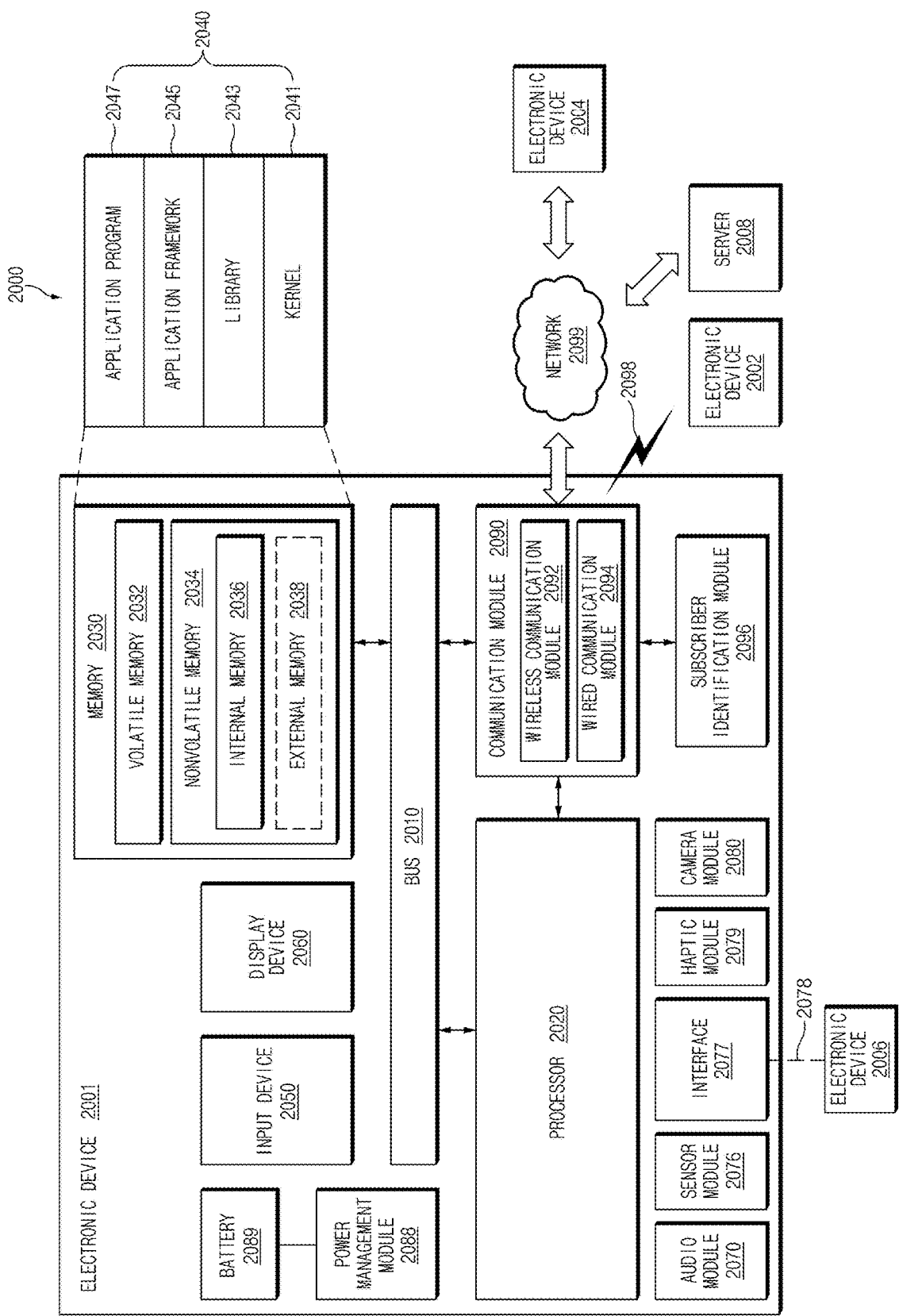
FIG. 20 illustrates, in block diagram format, an electronic device in a network environment, according to various embodiments of this disclosure.

FIG. 20 illustrates, in block diagram format, an electronic device 2001 in a network environment 2000, according to various embodiments of the present disclosure. According to various embodiments disclosed in the present disclosure, the electronic device 2001 may include various types of devices. For example, the electronic device 2001 may include at least one of a portable communication device (e.g., smartphones), a computer device (e.g., a personal digital assistant (PDA), a tablet personal computers (PC), a laptop PC, a desktop PC, a workstation, or a server), a portable multimedia device (e.g., an e-book reader or an MP3 player), a portable medical device (e.g., a heart rate, blood glucose, blood pressure, or a thermometer), a camera, or a wearable device. A wearable device may include at least one of an accessory type of a device (e.g., a timepiece, a ring, a bracelet, an anklet, a necklace, glasses, a contact lens, or a head-mounted device (HMD)), one-piece fabric or clothes type of a device (e.g., electronic clothes), a body-attached type of a device (e.g., a skin pad or a tattoo), or a bio-implantable circuit. According to embodiments, the electronic device may include at least one of, for example, televisions (TVs), digital versatile disc (DVD) players, an audio device, audio accessory devices (e.g., a speaker, a headphone, or a headset), a refrigerator, an air conditioner, a cleaner, an oven, a microwave oven, a washing machine, an air cleaner, a set-top box, a home automation control panel, a security control panel, a game console, an electronic dictionary, an electronic key, a camcorder, or an electronic picture frame.

According to another embodiment, the electronic device may include at least one of a navigation device, a global navigation satellite system (GNSS), an event data recorder (EDR) (e.g., a black box for a car, a ship, or a plane), a vehicle infotainment device (e.g., a heads-up display for a vehicle), an industrial or home robot, a drone, an automated teller machine (ATM), a point of sales (POS) device, a measurement device (e.g., a water meter, an electricity meter, or a gas meter), or Internet of things device (e.g., a light bulb, a sprinkler device, a fire alarm, a thermostat, or a street lamp). According to an embodiment of the disclosure, the electronic device is not limited to the above-described devices. For example, similarly to a smartphone having function of measuring personal bio-information (e.g., a heart rate or blood glucose), the electronic device may provide functions of multiple devices in the complex manner. In the present disclosure, the term "user" used herein may refer to a person who uses the electronic device or may refer to a device (e.g., an artificial intelligence electronic device) that uses the electronic device.

Referring to the non-limiting example of FIG. 20, within the network environment 2000, the electronic device 2001 (e.g., the user terminal 100) may communicate with an electronic device 2002 through local wireless communication 2098 or may communicate with an electronic device 2004 or a server 2008 (e.g., the intelligence server 200) through a network 2099. According to an embodiment, the electronic device 2001 may communicate with the electronic device 2004 through the server 2008.

According to some embodiments, the electronic device 2001 (e.g., the user terminal 100) may include a bus 2010, a processor 2020, a memory 2030, an input device 2050 (e.g., a micro-phone or a mouse), a display 2060, an audio module 2070, a sensor module 2076, an interface 2077, a haptic module 2079, a camera module 2080, a power management module 2088, a battery 2089, a communication module 2090, and a subscriber identification module 2096. According to an embodiment, the electronic device 2001 may not include at least one (e.g., the display 2060 or the camera module 2080) of the above-described elements or may further include other element(s).

For example, the bus 2010 may interconnect the above-described elements 2020 to 2090 and may include a circuit for conveying signals (e.g., a control message or data) between the above-described elements.

The processor 2020 (e.g., the processor 150) may include one or more of a central processing unit (CPU), an application processor (AP), a graphic processing unit (GPU), an image signal processor (ISP) of a camera or a communication processor (CP). According to an embodiment, the processor 2020 may be implemented with a system on chip (SoC) or a system in package (SiP). For example, the processor 2020 may drive an operating system (OS) or an application to control at least one of another element (e.g., hardware or software element) connected to the processor 2020 and may process and compute various data. The processor 2020 may load an instruction or data, which is received from at least one of other elements (e.g., the communication module 2090), into a volatile memory 2032 to process the instruction or data and may store the process result data into a nonvolatile memory 2034.

The memory 2030 (e.g., the memory 140) may include, for example, the volatile memory 2032 or the nonvolatile memory 2034. The volatile memory 2032 may include, for example, a random access memory (RAM) (e.g., a dynamic random access memory (DRAM), a static RAM (SRAM), or a synchronous DRAM (SDRAM)). The nonvolatile memory 2034 may include, for example, a programmable read-only memory (PROM), an one time programmable read-only memory (OTPROM), an erasable programmable read-only memory (EPROM), an electrically erasable programmable read-only memory (EEPROM), a mask ROM, a flash ROM, a flash memory, a hard disk drive, or a solid-state drive (SSD). In addition, the nonvolatile memory 2034 may be configured in the form of an internal memory 2036 or the form of an external memory 2038 which is available through connection only if necessary, according to the connection with the electronic device 2001. The external memory 2038 may further include a flash drive such as compact flash (CF), secure digital (SD), micro secure digital (Micro-SD), mini secure digital (Mini-SD), extreme digital (xD), a multimedia card (MMC), or a memory stick. The external memory 2038 may be operatively or physically connected with the electronic device 2001 in a wired manner (e.g., a cable or a universal serial bus (USB)) or a wireless (e.g., Bluetooth) manner.

For example, the memory 2030 may store, for example, at least one different software element, such as an instruction or data associated with the program 2040, of the electronic device 2001. The program 2040 may include, for example, a kernel 2041, a library 2043, an application framework 2045 or an application program (interchangeably, "application") 2047.

The input device 2050 may include a microphone, a mouse, or a keyboard. According to an embodiment, the keyboard may include a keyboard physically connected or a keyboard virtually displayed through the display 2060.

The display 2060 may include a display, a hologram device or a projector, and a control circuit to control a relevant device. The screen may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 2001.

The audio module 2070 may convert, for example, from a sound into an electrical signal or from an electrical signal into the sound. According to an embodiment, the audio module 2070 may acquire sound through the input device 2050 (e.g., a microphone) or may output sound through an output device (not illustrated) (e.g., a speaker or a receiver) included in the electronic device 2001, an external electronic device (e.g., the electronic device 2002 (e.g., a wireless speaker or a wireless headphone)) or an electronic device 2006 (e.g., a wired speaker or a wired headphone) connected with the electronic device 2001.

The sensor module 2076 may measure or detect, for example, an internal operating state (e.g., power or temperature) or an external environment state (e.g., an altitude, a humidity, or brightness) of the electronic device 2001 to generate an electrical signal or a data value corresponding to the information of the measured state or the detected state. The sensor module 2076 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 2076 may further include a control circuit for controlling at least one or more sensors included therein. According to an embodiment, the electronic device 2001 may control the sensor module 2076 by using the processor 2020 or a processor (e.g., a sensor hub) separate from the processor 2020. In the case that the separate processor (e.g., a sensor hub) is used, while the processor 2020 is in a sleep state, the electronic device 2001 may operate without awakening the processor 2020 to control at least a portion of the operation or the state of the sensor module 2076.

According to at least one embodiment, the interface 2077 may include a high definition multimedia interface (HDMI), a universal serial bus (USB), an optical interface, a recommended standard 232 (RS-232), a D-subminiature (D-sub), a mobile high-definition link (MHL) interface, a SD card/MMC(multi-media card) interface, or an audio interface. A connector 2078 may physically connect the electronic device 2001 and the electronic device 2006. According to some embodiments, the connector 2078 may include, for example, an USB connector, an SD card/MMC connector, or an audio connector (e.g., a headphone connector).

The haptic module 2079 may convert an electrical signal into mechanical stimulation (e.g., vibration or motion) or into electrical stimulation. For example, the haptic module 2079 may apply tactile or kinesthetic stimulation to a user. The haptic module 2079 may include, for example, a motor, a piezoelectric element, or an electric stimulator.

The camera module 2080 may capture, for example, a still image and a moving picture. According to an embodiment, the camera module 2080 may include at least one lens (e.g., a wide-angle lens and a telephoto lens, or a front lens and a rear lens), an image sensor, an image signal processor, or a flash (e.g., a light emitting diode or a xenon lamp).

The power management module 2088, which is to manage the power of the electronic device 2001, may constitute at least a portion of a power management integrated circuit (PMIC).

The battery 2089 may include a primary cell, a secondary cell, or a fuel cell and may be recharged by an external power source to supply power at least one element of the electronic device 2001.

The communication module 2090 may establish a communication channel between the electronic device 2001 and an external device (e.g., the first external electronic device 2002, the second external electronic device 2004, or the server 2008). The communication module 2090 may support wired communication or wireless communication through the established communication channel. According to an embodiment, the communication module 2090 may include a wireless communication module 2092 or a wired communication module 2094. The communication module 2090 may communicate with the external device through a first network 2098 (e.g. a wireless local area network such as Bluetooth or infrared data association (IrDA)) or a second network 2099 (e.g., a wireless wide area network such as a cellular network).

The wireless communication module 2092 (e.g., wireless communication circuit) may support, for example, cellular communication, local wireless communication, global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), WiFi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou), a European global satellite-based navigation system (Galileo), or the like. In the present disclosure, "GPS" and "GNSS" may be interchangeably used.

According to some embodiments, when the wireless communication module 2092 supports cellular communication, the wireless communication module 2092 may, for example, identify or authenticate the electronic device 2001 within a communication network using the subscriber identification module 2096. According to certain embodiments, the wireless communication module 2092 may include a communication processor (CP) separate from the processor 2020 (e.g., an application processor (AP)). In this case, the communication processor may perform at least a portion of functions associated with at least one of elements 2010 to 2096 of the electronic device 2001 in substitute for the processor 2020 when the processor 2020 is in an inactive (sleep) state, and together with the processor 2020 when the processor 2020 is in an active state. According to various embodiments, the wireless communication module 2092 may include a plurality of communication modules, each supporting only a relevant communication scheme among cellular communication, short-range wireless communication, or a GNSS communication scheme.

The wired communication module 2094 may include, for example, include a local area network (LAN) service, a power line communication, or a plain old telephone service (POTS).

For example, the first network 2098 may employ, for example, Wi-Fi direct or Bluetooth for transmitting or receiving instructions or data through wireless direct connection between the electronic device 2001 and the first external electronic device 2002. The second network 2099 may include a telecommunication network (e.g., a computer network such as a LAN or a WAN, the Internet or a telephone network) for transmitting or receiving instructions or data between the electronic device 2001 and the second electronic device 2004.

According to certain embodiments, the instructions or the data may be transmitted or received between the electronic device 2001 and the second external electronic device 2004 through the server 2008 connected with the second network. Each of the external first and second external electronic devices 2002 and 2004 may be a device of which the type is different from or the same as that of the electronic device 2001. According to various embodiments, all or a part of operations that the electronic device 2001 will perform may be executed by another or a plurality of electronic devices (e.g., the electronic devices 2002 and 2004 or the server 2008). According to an embodiment, in the case that the electronic device 2001 executes any function or service automatically or in response to a request, the electronic device 2001 may not perform the function or the service internally, but may alternatively or additionally transmit requests for at least a part of a function associated with the electronic device 2001 to another device (e.g., the electronic device 2002 or 2004 or the server 2008). The other electronic device (e.g., the electronic device 2002 or 2004 or the server 2008) may execute the requested function or additional function and may transmit the execution result to the electronic device 2001. The electronic device 2001 may provide the requested function or service using the received result or may additionally process the received result to provide the requested function or service. To this end, for example, cloud computing, distributed computing, or client-server computing may be used.

According to certain embodiments of the present disclosure, an electronic device (e.g., the user terminal 100) may include a housing, a touchscreen 120 display exposed through a part of the housing, a wireless communication circuit (e.g., wireless communication module 2092) disposed inside the housing, a memory 140 storing a framework 920, and at least one processor 150 electrically connected to the touchscreen display 120, the wireless communication circuit (e.g., wireless communication module 2092), and the memory 140. The processor 150 is configured to receive a first event from the outside of the electronic device through the wireless communication circuit (e.g., wireless communication module 2092) or to receive a second event generated from the inside of the electronic device, to provide the framework 920 with a notification object associated with an event received among the first event and the second event, to parse the notification object to obtain one or more parameters, to select one or more tasks associated with the received event based on at least part of the one or more parameters by using the framework 920, to select a natural language expression indicating at least one task of the one or more tasks, to provide a user interface including the natural language expression, through the touchscreen display 120, and to execute the at least one task based at least partly on a user input of the natural language expression provided on the touchscreen display 120.

According to some embodiments, the processor 150 may be configured to receive the at least one task of the one or more tasks from an external electronic device (e.g., the hint server 1050 or the intelligence server 1060) through the wireless communication circuit (e.g., wireless communication module 2092).

According to various embodiments, the processor 150 may be configured to transmit at least one parameter of the one or more parameters to the external electronic device and to receive the at least one task as a response to the transmission of the at least one parameter, from the external electronic device (e.g., the hint server 1050 or the intelligence server 1060).

According to at least one embodiment, the processor 150 may be configured to receive the natural language expression from an external electronic device (e.g., the intelligence server 1060) by using the wireless communication circuit (e.g., wireless communication module 2092).

According to certain embodiments, the processor 150 may be configured to transmit at least one parameter of the one or more parameters to the external electronic device (e.g., the intelligence server 1060) and to receive the natural language expression as a response to the transmission of the at least one parameter, from the external electronic device (e.g., the intelligence server 1060).

According to some embodiments, the at least one task may include a first task and a second task. The processor 150 may be configured to provide a first natural language expression indicating the first task, and a second natural language expression indicating the second task as at least part of the natural language expression, through the user interface.

According to at least one embodiment, the memory 140 may store a plurality of tasks including the one or more tasks. The processor 150 may be configured to select the one or more tasks from the plurality of tasks.

According to some embodiments, the plurality of tasks may include a first set of tasks including one or more first tasks corresponding to a first domain and a second set of tasks including one or more second tasks corresponding to a second domain. The processor 150 may be configured, if the received event corresponds to the first domain, to select the one or more first tasks from the first set of tasks, and, if the received event corresponds to the second domain, to select the one or more second tasks from the second set of tasks.

According to various embodiments, the first domain may correspond to a first application program and the second domain may correspond to a second application program. The processor 150 may be configured to select the one or more first tasks or the one or more second tasks further based on an application program corresponding to the received event.

According to some embodiments, the processor 150 may be configured to obtain context information of the electronic device and to select the one or more tasks based at least partly on the context information.

According to certain embodiments, the context information of the electronic device may include information of an application program being executed by the electronic device.

According to some embodiments, the first event from the outside of the electronic device may include a reception of a call, a short message, or an instant message, which is associated with a specified application program.

According to various embodiments, the second event generated from the inside of the electronic device may be associated with power management, a memory state, or security of the electronic device.

According to at least one embodiment of the present disclosure, a method of generating a hint may include receiving a first event from the outside of an electronic device or receiving a second event generated from the inside of the electronic device, providing a framework 920 with a notification object associated with an event received among the first event and the second event, parsing the notification object to obtain one or more parameters, selecting one or more tasks associated with the received event based on at least part of the one or more parameters by using the framework 920, selecting a request for a natural language expression indicating at least one task of the one or more tasks, providing a user interface including the natural language expression through a touchscreen display, 120 and executing the at least one task based at least partly on a user input of the natural language expression through the touchscreen display 120.

According to various embodiments, the method may further include receiving the at least one task of the one or more tasks from an external electronic device, before the selecting of the one or more tasks.

According to some embodiments, the method may further include transmitting at least one parameter of the one or more parameters to the external electronic device, before the receiving of the at least one task. The at least one task may be received as a response to the transmission of the at least one parameter.

According to some embodiments, the selecting of the one or more tasks may include selecting the one or more tasks from a plurality of tasks stored in a memory 140 of the electronic device.

According to at least one embodiment, the plurality of tasks may include a first set of tasks including one or more first tasks corresponding to a first domain and a second set of tasks including one or more second tasks corresponding to a second domain. The selecting of the one or more tasks may include, if the received event corresponds to the first domain, selecting the one or more first tasks from the first set of tasks and if the received event corresponds to the second domain, selecting the one or more second tasks from the second set of tasks.

According to certain embodiments, the method may further include, before the selecting of the one or more tasks, obtaining context information of the electronic device. The selecting of the one or more tasks may include selecting the one or more tasks based at least partly on the context information.

According to some embodiments of the present disclosure, a computer-readable recording medium may store instructions, when executed by a processor 150 of an electronic device, causing the electronic device to receive a first event from the outside of the electronic device or receive a second event generated from the inside of the electronic device, to provide a framework 920 with a notification object associated with an event received among the first event and the second event, to parse the notification object to obtain one or more parameters, to select one or more tasks associated with the received event based on at least part of the one or more parameters by using the framework 920, to select a request for a natural language expression indicating at least one task of the one or more tasks, to provide a user interface including the natural language expression through a touchscreen display 120, and to execute the at least one task based at least partly on a user input of the natural language expression through the touchscreen display 120.

Various embodiments of the present disclosure and terms used herein are not intended to limit the technologies described in the present disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "at least one of A and/or B", "A, B, or C", or "at least one of A, B, and/or C", and the like used herein may include any and all combinations of one or more of the associated listed items. Expressions such as "first", or "second" and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

According to the situation, the expression "adapted to or configured to" used herein may be interchangeably used as, for example, the expression "suitable for", "having the capacity to", "changed to", "made to", "capable of" or "designed to". The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a central processing unit (CPU) or an application processor) which performs corresponding operations by executing one or more software programs which are stored in a memory device (e.g., the memory 2030).

The term "module" used in this specification may include a unit implemented with hardware, software, or firmware. For example, the term "module" may be interchangeably used with the term "logic", "logic block", "component", "circuit", and the like. The "module" may be an integrated component, a minimum unit for performing one or more functions, or a part thereof. The "module" may be implemented mechanically or electronically. For example, the module may include a well-known or to-be-developed application-specific integrated circuit (ASIC) chip, field-programmable gate arrays (FPGAs), or programmable logic device that perform any operations.

According to various embodiments, at least a part of an apparatus (e.g., modules or functions thereof) or a method (e.g., operations) may be, for example, implemented by instructions stored in a computer-readable storage media (e.g., the memory 2030) in the form of a program module. The instruction, when executed by a processor (e.g., a processor 2020), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The instruction may include codes created by a compiler or codes that are capable of being executed by a computer by using an interpreter.

Each element (e.g., a module or a program module) according to various embodiments may be composed of single entity or a plurality of entities, and a part of the above-described sub-elements may be omitted or may further include other elements. Alternatively or additionally, after being integrated in one entity, some elements (e.g., a module or a program module) may identically or similarly perform the function executed by each corresponding element before integration. Operations executed by modules, program modules, or other elements may be executed by a successive method, a parallel method, a repeated method, or a heuristic method. Alternatively, at least some of the operations may be executed in another order or may be omitted, or any other operation may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a display;
a wireless communication circuit;
a memory; and
at least one processor electrically connected to the display, the wireless communication circuit, and the memory,
wherein the at least one processor is configured to:
execute an application,
display a notification indicating an event on the display, while the application is being executed, wherein the event is generated by the electronic device and associated with one of power management, a memory state, or security of the electronic device,
obtain one or more parameters from the notification by parsing the notification,
obtain one or more tasks associated with the event based on the one or more parameters and the application being executed,
display a user interface including a natural language expression indicating at least one task on the display,
receive a user input selecting at least a part of the natural language expression, and
execute the at least one task based on the user input.

2. The electronic device of claim 1, wherein the at least one processor is further configured to obtain the at least one task from an external electronic device using the wireless communication circuit.

3. The electronic device of claim 2, wherein the at least one processor is further configured to:
transmit at least one parameter of the one or more parameters to the external electronic device, and
receive, from the external electronic device, the at least one task as a response to transmitting the at least one parameter.

4. The electronic device of claim 1, wherein the at least one processor is further configured to receive the natural language expression from an external electronic device using the wireless communication circuit.

5. The electronic device of claim 4, wherein the at least one processor is further configured to:
transmit at least one parameter of the one or more parameters to the external electronic device, and
receive, from the external electronic device, the natural language expression as a response to transmitting the at least one parameter.

6. The electronic device of claim 1, wherein the at least one task includes a first task and a second task, and
wherein the at least one processor is further configured to:
display a first natural language expression indicating the first task, and a second natural language expression indicating the second task as at least part of the natural language expression, through the user interface.

7. The electronic device of claim 1, wherein the memory stores a plurality of tasks including the one or more tasks, and
wherein the at least one processor is further configured to obtain the one or more tasks from the plurality of tasks in the memory.

8. The electronic device of claim 7, wherein the plurality of tasks includes a first set of tasks including one or more first tasks corresponding to a first domain and a second set of tasks including one or more second tasks corresponding to a second domain, and
wherein the at least one processor is further configured to:
if the event corresponds to the first domain, select the one or more first tasks from the first set of tasks, and if the event corresponds to the second domain, select the one or more second tasks from the second set of tasks.

9. The electronic device of claim 1, wherein the at least one processor is further configured to:
obtain context information of the electronic device, and
generate the one or more tasks based at least in part on the context information.

10. The electronic device of claim 9, wherein the context information of the electronic device comprises information of the application being executed by the electronic device.

11. The electronic device of claim 1, wherein the event includes a reception of a call, a short message, or an instant message.

12. The electronic device of claim 1, wherein,
in response to the event being associated with power management of the electronic device, the at least one task comprises executing a power save mode, and
in response to the event being associated with the security of the electronic device, the at least one task comprises performing a security test of the electronic device.

13. A non-transitory computer-readable medium is stored with instructions, which when executed by an electronic device, cause the electronic device to:
execute an application;
display a notification indicating an event on a display of the electronic device while the application is being executed, wherein the event is generated by the electronic device and associated with one of power management, a memory state, or security of the electronic device;
obtain one or more parameters from the notification by parsing the notification;
obtain one or more tasks associated with the event based on the one or more parameters;
display a user interface including a natural language expression indicating at least one task on the display;
receive a user input selecting at least a part of the natural language expression; and
execute the at least one task based on the user input.

14. The non-transitory computer readable medium of claim 13, wherein obtaining the one or more tasks comprises:
receiving the at least one task of the one or more tasks from an external electronic device, before receiving the user input.

15. The non-transitory computer readable medium of claim 14, wherein obtaining one or more tasks further comprises:
transmitting at least one parameter of the one or more parameters to the external electronic device, before receiving the at least one task.

16. The non-transitory computer readable medium of claim 13, wherein obtaining the one or more tasks includes selecting the one or more tasks from a plurality of tasks stored in a memory of the electronic device.

17. The non-transitory computer readable medium of claim 16, wherein the plurality of tasks includes a first set of tasks including one or more first tasks corresponding to a first domain and a second set of tasks including one or more second tasks corresponding to a second domain, and
wherein selecting the one or more tasks includes:
if the event corresponds to the first domain, selecting the one or more first tasks from the first set of tasks; and
if the event corresponds to the second domain, selecting the one or more second tasks from the second set of tasks.

18. The non-transitory computer readable medium of claim 13, wherein obtaining one or more tasks comprises:
obtaining context information of the electronic device; and
generating the one or more tasks based on the one or more parameters and the context information.

* * * * *